(12) United States Patent
Liu et al.

(10) Patent No.: US 10,165,464 B2
(45) Date of Patent: Dec. 25, 2018

(54) NAN DATAPATH QUALITY OF SERVICE SUPPORT

(71) Applicant: Apple Inc., Cupertino, CA (US)

(72) Inventors: Yong Liu, Campbell, CA (US); Christiaan A. Hartman, San Jose, CA (US); Daniel R. Borges, San Francisco, CA (US); Guoqing Li, Cupertino, CA (US); Lawrie Kurian, San Jose, CA (US); Nathan A. Kralian, Morgan Hill, CA (US); Peter N. Heerboth, San Jose, CA (US); Su Khiong Yong, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 58 days.

(21) Appl. No.: 15/271,502

(22) Filed: Sep. 21, 2016

(65) Prior Publication Data

US 2017/0094554 A1 Mar. 30, 2017

Related U.S. Application Data

(60) Provisional application No. 62/234,161, filed on Sep. 29, 2015.

(51) Int. Cl.
*H04W 28/02* (2009.01)
*H04W 8/00* (2009.01)
(Continued)

(52) U.S. Cl.
CPC ..... *H04W 28/0268* (2013.01); *H04L 67/1042* (2013.01); *H04W 8/005* (2013.01)

(58) Field of Classification Search
CPC .............. H04W 28/0268; H04W 8/005; H04L 67/1042
(Continued)

(56) References Cited

U.S. PATENT DOCUMENTS

| 2006/0003733 A1* | 1/2006 | Chun | H04W 28/24 455/403 |
| 2010/0220687 A1* | 9/2010 | Reznik | H04W 36/005 370/331 |

(Continued)

*Primary Examiner* — Faisal Choudhury
(74) *Attorney, Agent, or Firm* — Meyertons Hood Kivlin Kowert & Goetzel, P.C.; Jeffrey C. Hood; Brian E. Moore

(57) ABSTRACT

In embodiments, one or more wireless stations operate to configure direct communication with neighboring mobile stations, i.e., direct communication between the mobile stations without utilizing an intermediate access point. Embodiments of the disclosure relate to NAN datapath scheduling and NAN pre-datapath operation setup and scheduling. The NAN datapath embodiments described herein provide a mechanism through which devices can communicate and provide services. In particular, embodiments described herein provide a mechanism for NAN datapaths to support various levels of quality of service (QoS). Aspects of the datapath development include datapath scheduling, including datapath setup and scheduling attributes, as well as pre-datapath operation triggering and scheduling. Scheduling may include determination of a type of datapath, including paging and synchronized datapaths. NAN data cluster base schedules may be scheduled as equal-sets or subsets of datapath schedules. The datapath model may be implemented for unicast and multicast communication between wireless stations.

20 Claims, 14 Drawing Sheets

(51) Int. Cl.
*H04L 29/08* (2006.01)
*H04L 12/28* (2006.01)

(58) Field of Classification Search
USPC .......................................................... 370/254
See application file for complete search history.

(56) References Cited

U.S. PATENT DOCUMENTS

| | | | |
|---|---|---|---|
| 2013/0142052 A1* | 6/2013 | Burbidge | H04W 76/028 370/242 |
| 2013/0308549 A1* | 11/2013 | Madan | H04W 28/26 370/329 |
| 2016/0065410 A1* | 3/2016 | Brunet | H04L 41/0846 709/221 |
| 2016/0174136 A1 | 6/2016 | Patil et al. | |
| 2016/0286398 A1 | 9/2016 | Abraham et al. | |
| 2016/0309493 A1 | 10/2016 | Shmukler et al. | |
| 2016/0309496 A1 | 10/2016 | Huang et al. | |
| 2016/0360410 A1* | 12/2016 | Obaidi | H04W 12/08 |

* cited by examiner

NAN DATAPATH QUALITY OF SERVICE SUPPORT

PRIORITY DATA

This application claims the benefit of priority to U.S. Provisional Application Ser. No. 62/234,161, titled "NAN Datapath Quality of Service Support", filed Sep. 29, 2015, by Yong Liu, Christiaan A. Hartman, Daniel R. Borges, Guoqing Li, Lawrie Kurian, Nathan A. Kralian, Peter N. Heerboth, and Su Khiong Yong, which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems Wi-Fi mobile stations are able to communicate directly with each other without using an intermediate access point. However, improvements in the operation of such devices are desired, such as in setup and coordination of the communication between such devices.

SUMMARY

Embodiments described herein relate to a system and method of NAN datapath quality of service support.

Embodiments relate to a wireless station that includes one or more antennas, one or more radios, and one or more processors coupled (directly or indirectly) to the radios. At least one radio is configured to perform Wi-Fi communications. The wireless station may perform voice and/or data communications, as well as the methods described herein.

In some embodiments, one or more wireless stations operate to configure direct communication with neighboring mobile stations, i.e., direct communication between the mobile stations without utilizing an intermediate access point. Embodiments of the disclosure relate to NAN datapath scheduling and NAN pre-datapath operation setup and scheduling. The NAN datapath embodiments described herein provide a mechanism through which devices can communicate and provide services. In particular, embodiments described herein provide a mechanism for NAN datapaths to support various levels of quality of service (QoS). Aspects of the datapath development include datapath scheduling, including datapath setup and scheduling attributes, as well as pre-datapath operation triggering and scheduling. Scheduling may include determination of a type of datapath, including paging and synchronized datapaths. NAN data cluster base schedules may be scheduled as equal-sets or subsets of datapath schedules. The datapath model may be implemented for unicast and multicast communication between wireless stations.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
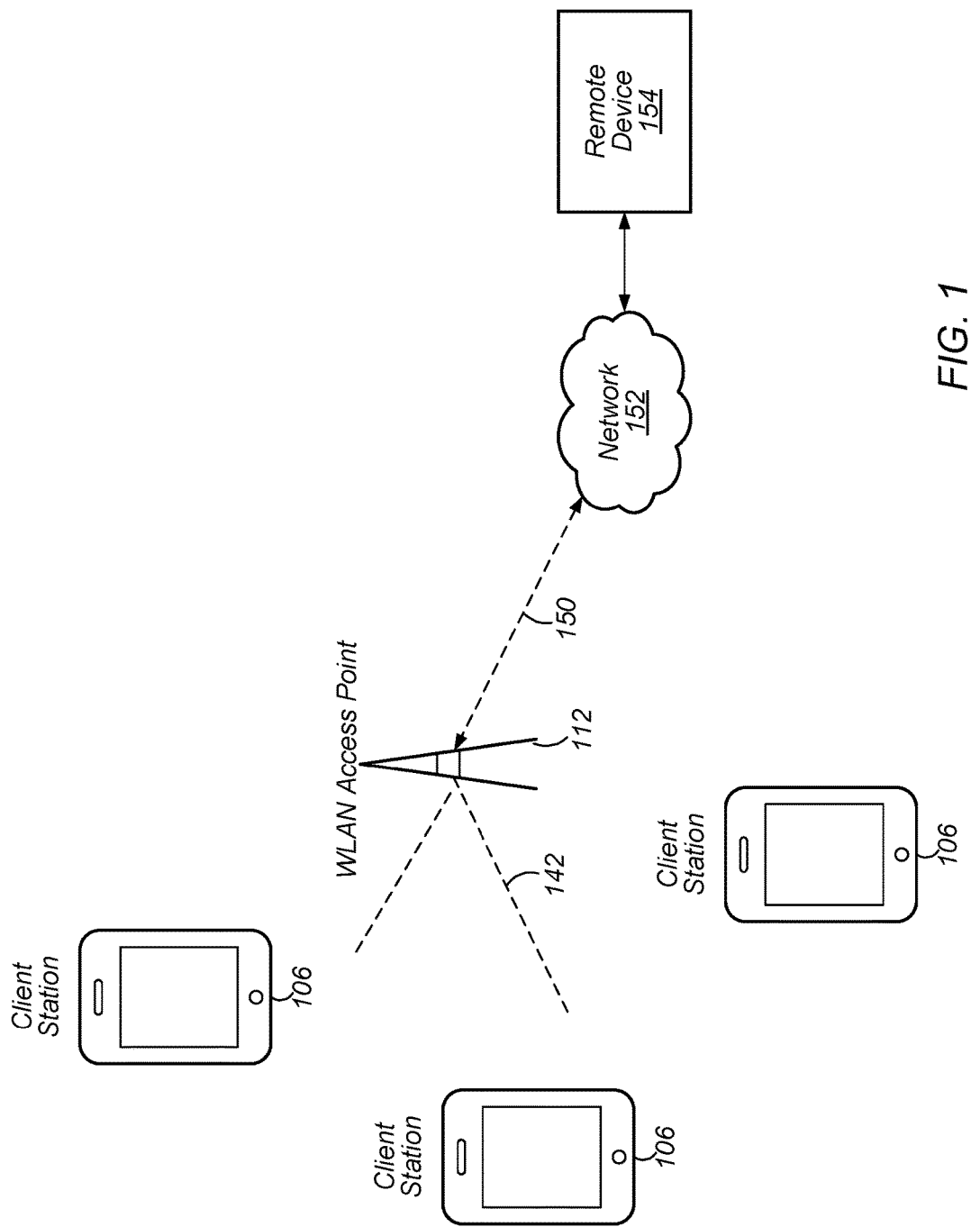
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:
  UE: User Equipment
  AP: Access Point
  DL: Downlink (from BS to UE)
  UL: Uplink (from UE to BS)
  TX: Transmission/Transmit
  RX: Reception/Receive
  LAN: Local Area Network
  WLAN: Wireless LAN
  RAT: Radio Access Technology
  DW: Discovery Window
  NW: Negotiation Window
  FAW: Further Availability Window
  SID: Service ID
  SInf: Service Information
  Sinf-Seg: Service Information Segment
  NW-Req: to request the peer NAN device to present in NW
  CaOp: Capabilities and Operations elements
  Security: Security preferences
  SessionInfo: advertisement_id, session_mac, session_id, port, proto
  ChList: preferred datapath channels
  AM: anchor master
  DW: discovery window
  HCFR: hop count from remote devices
  NAN: neighbor awareness network
  SDA: service descriptor attribute
  SDF: service discovery frame
  SRF: service response filter
  TSF: time synchronization function
Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™ Play Station Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices, without use of the access point 112.

In some embodiments, as further described below, a wireless device 106 may be configured to perform methods for negotiating quality of service requirements for a peer-to-peer data path. In some embodiments, the wireless device 106 may be configured to detect a neighboring wireless device that is configured to perform peer-to-peer Wi-Fi communication and establish, via peer-to-peer negotiation, a datapath schedule for a service with the neighboring wireless station, where the datapath schedule is based (at least in part) on quality of service requirements of the service. In some embodiments, the wireless device 106 may be configured to determine the quality of service requirements for the service.

Figure 2:
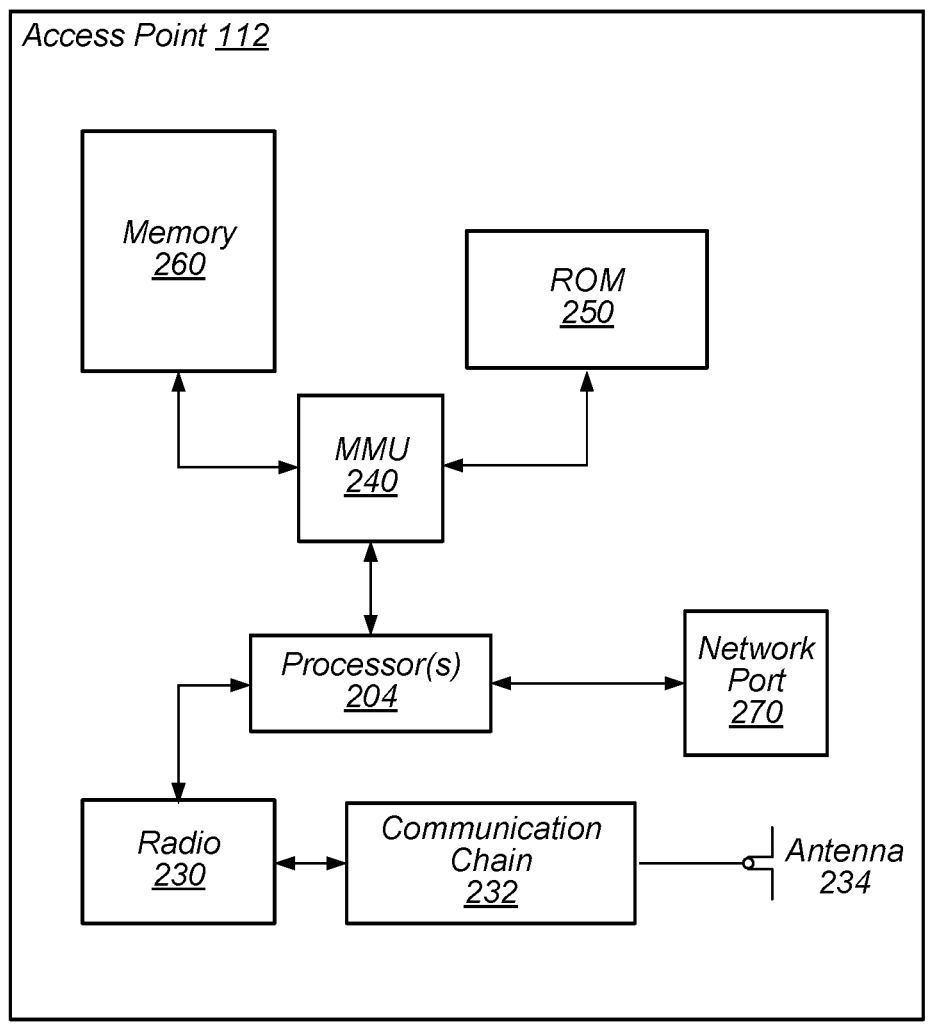
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods for negotiating quality of service requirements for a peer-to-peer data path. In some embodiments, the AP 112 may be configured to detect a neighboring wireless device that is configured to perform peer-to-peer Wi-Fi communication and establish, via peer-to-peer negotiation, a datapath schedule for a service with the neighboring wireless station, where the datapath schedule is based (at least in part) on quality of service requirements of the service. In some embodiments, the AP 112 may be configured to determine the quality of service requirements for the service.

Figure 3:
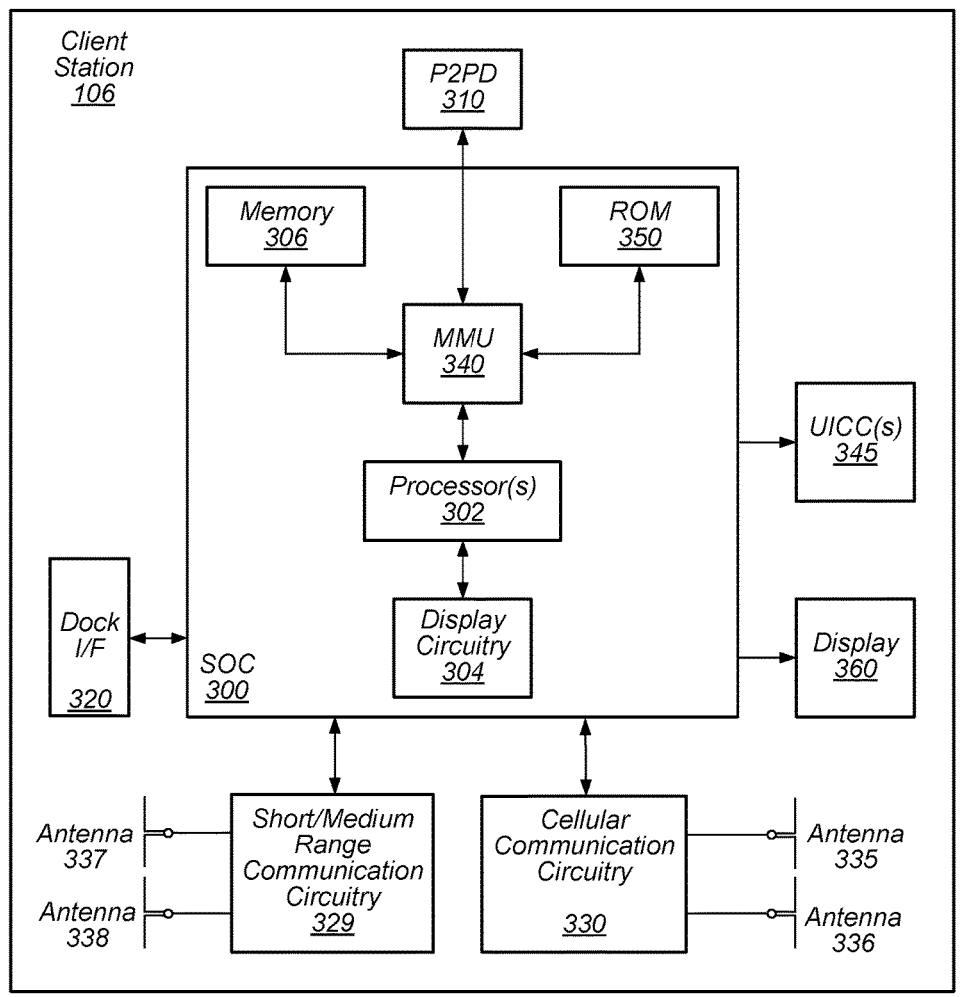
FIG. 3 illustrates an example simplified block diagram of a mobile station (UE), according to some embodiments.

FIG. 3—Client Station Block Diagram

FIG. 3 illustrates an example simplified block diagram of a client station 106. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods for negotiating quality of service requirements for a peer-to-peer data path. In some embodiments, the client station 106 may be configured to detect a neighboring wireless device that is configured to perform peer-to-peer Wi-Fi communication and establish, via peer-to-peer negotiation, a datapath schedule for a service with the neighboring wireless station, where the datapath schedule is based (at least in part) on quality of service requirements of the service. In some embodiments, the client station 106 may be configured to determine the quality of service requirements for the service.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition), the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocol

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability beyond discovery windows.

The NAN protocol includes two aspects: 1) synchronization and discovery (NAN 1.0) and 2) datapath transmission (NAN 2.0). NAN 1.0 describes methods for NAN protocol synchronization and discovery. After two wireless stations have discovered each other (per NAN 1.0) they may implement a procedure to setup a NAN datapath between them so that they can properly communicate (as illustrated below in FIG. 5). After this, the two wireless stations arrange for a common datapath negotiation window so that they can negotiate capabilities, synchronization requirements, and exchange further service information. The datapath negotiation window is a time window that enables two wireless stations to communicate with each other so that they can negotiate these capabilities and synchronization requirements and exchange this further service information. Once the datapath negotiation window has been established and NAN datapath setup has been performed, the wireless stations may perform datapath synchronization to help ensure that the two stations stay synchronized with each other for proper communication. Finally, datapath resource allocation relates to two peer wireless stations communicating with each other regarding a common time slot and channel for communication. In other words, the two devices communicate with each other regarding which channel they should use and at which time slot, to help ensure proper communication between them. Additionally, the two devices communicate with each other regarding which channel and time slot each would prefer to use for future communications between the devices.

Figure 4:
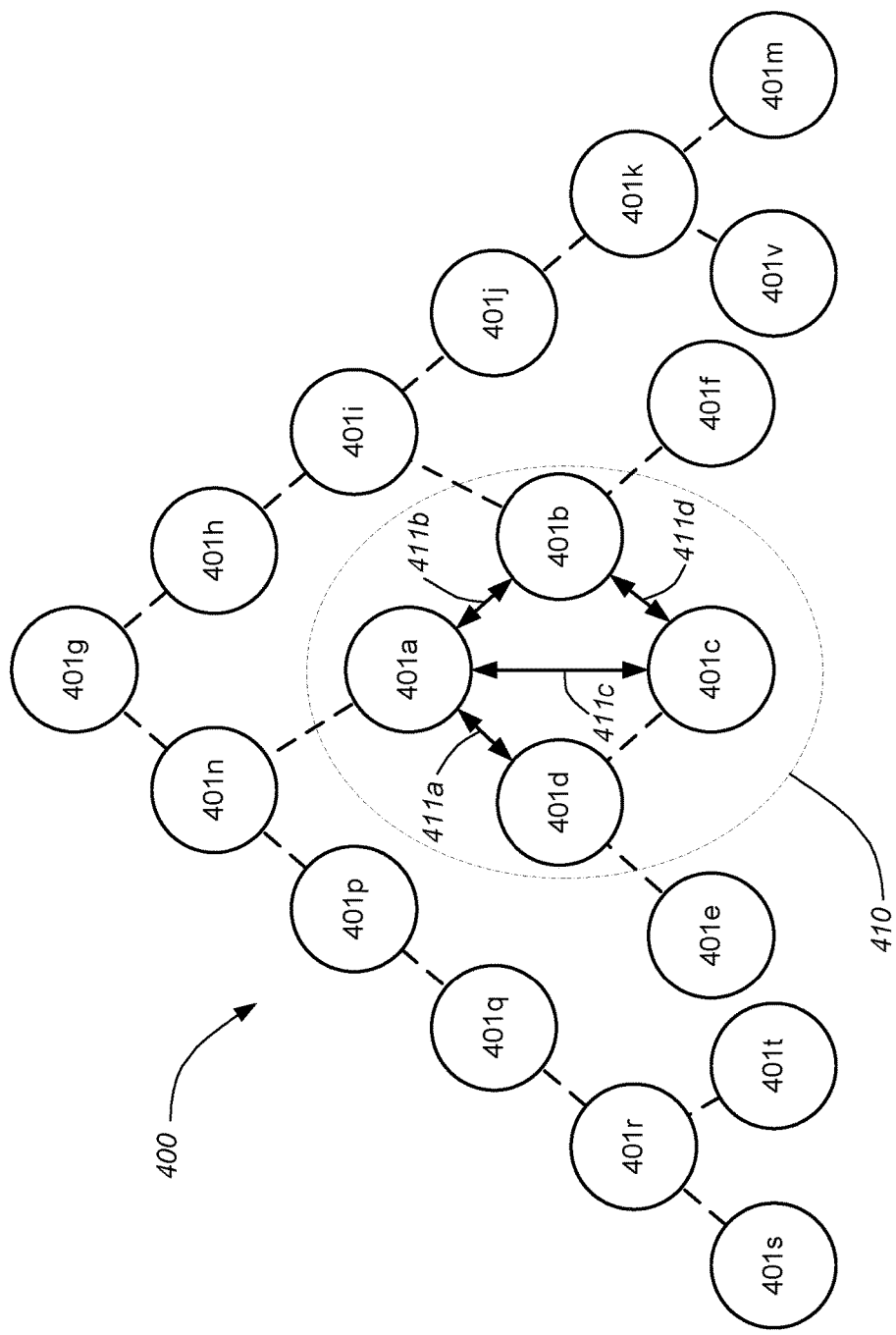
FIG. 4 illustrates an example of a NAN cluster that includes multiple NAN devices, according to the prior art.

FIG. 4 illustrates an example of a NAN cluster that includes multiple NAN devices, according to the prior art. As illustrated, NAN cluster 400 may include multiple NAN devices (e.g., nodes 401*a-h*) and a subset of the multiple NAN devices (e.g., nodes 401*a-d*) may be linked via NAN data links (e.g., NDLs 411*a-d*) within NAN cluster 400 and forms NAN data cluster 410. A NAN device pair (e.g., nodes 401*a* and 401*b*) in a common NAN cluster (e.g., NAN cluster 400) may set up a NAN data link (NDL) to support NAN datapaths for one or more services. NAN data cluster 410 includes NAN devices (e.g., nodes 401*a-d*) in a common NAN cluster (e.g., NAN cluster 400) that share a common base schedule (known as a NAN data cluster base schedule) and each member device (e.g., nodes 401*a-d*) of NAN data cluster 410 has at least one NDL (e.g., NDLs 411*a-d*) with another member device within NAN data cluster 410.

Note that a NAN device may be a member of more than one NAN cluster; however, an NDL belongs to exactly one NAN data cluster. Note further, that in a NAN data cluster, all member NAN devices may maintain tight synchronization amongst each other and may be present at a common (e.g., same) further availability slot(s) (or window(s)) as indicated by a NAN data cluster base schedule. In addition, each NDL may have its own NDL schedule and the NDL schedule may be a superset of the NAN data cluster base schedule. In some implementations, a NDL schedule for a NAN device may be negotiated with a peer NAN device and the NDL schedule may be also referred to as a NDL further availability (FA) schedule. The NDL schedule (NDL FA schedule) may support NAN datapaths for one or more services.

Figure 5:
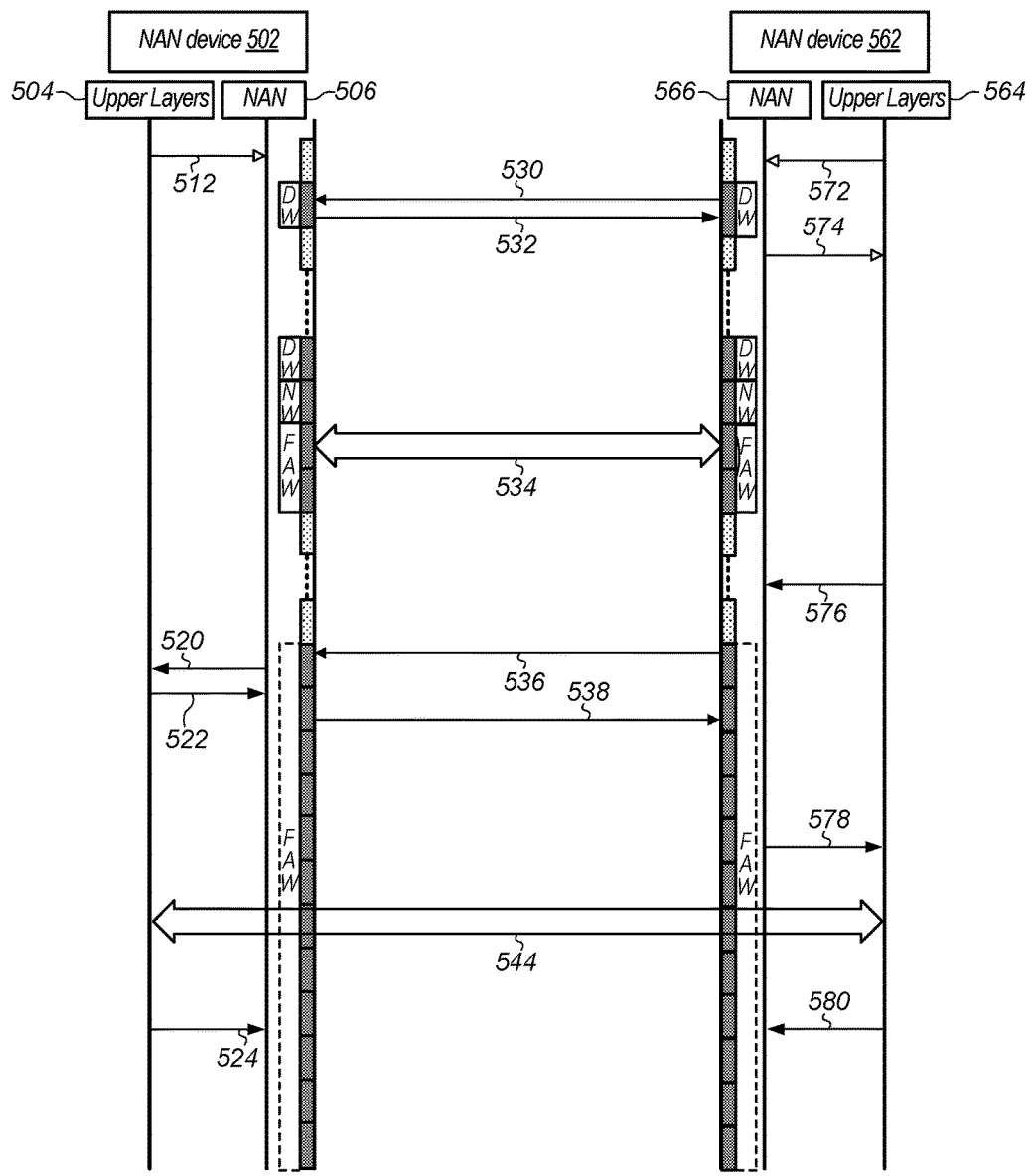
FIG. 5 illustrates a typical datapath negotiation between NAN devices, according to the prior art.

FIG. 5 illustrates a typical datapath negotiation between NAN devices, according to the prior art.

As shown, NAN device 502 may include upper layers 504 and NAN layer 506 and NAN device 562 may include upper layers 564 and NAN layer 566. Upper layers may initiate requests for services (e.g., such as publish request 512 and subscribe request 572). At 530, NAN device 562 may initiate a subscribe service discovery frame (SDF) and, at 532, NAN device 502 may respond with a publish SDF. At 574, NAN device 562 may determine a discovery match and pass discovery results from NAN layer 566 to upper layers 564.

At 534, further service discovery may be performed and at 576, upper layers 564 may pass a service request to NAN layer 566. Thus, at 536, NAN device 562 may send a datapath request to NAN device 502. At 520, NAN layer 506 may pass the datapath request to upper layers 504 and upper layers 504 may confirm the service request to NAN layer 506 at 522. At 538, NAN device 502 may send a datapath response to NAN device 562 and NAN layers 564 may pass the datapath response to upper layers 564 at 578.

At 544, upper layers 506 and 566 may perform datapath communications. At 524, upper layers 504 may pass a datapath end message to NAN layer 506. Similarly, at 578, upper layers 564 may pass a datapath end message to NAN layer 566.

As FIG. 5 illustrates, NAN DL and NAN datapath management protocols specify negotiation and scheduling of a datalink (and datapath), however, NAN DL and NAN datapath management protocols do not specify how to meet a particular service's quality of service (QoS) requirements. Additionally, allocation of radio resources based on service requirements and device capabilities has not been addressed by current protocols.

Thus, embodiments described herein further define methods for a NAN datapath to support varying levels of quality of service.

NAN Datapath QoS Support

There are at least three stages of NAN datapath QoS support—setup, termination, and maintenance. In some embodiments, QoS may be negotiated prior to setup of a NAN datapath. In other words, pre NAN datapath QoS (quality of service) negotiations may be performed between peer NAN devices. In some embodiments, initial QoS requirements and/or capabilities may be communicated (or conveyed) via any of a publish, a subscription, and/or a further service discovery message. Further, during pre-NAN datapath QoS negotiations, a QoS source, with limited or no knowledge of a QoS sink, may propose initial requirements based on at least one of QoS requirements for a service data control session and/or minimum, preferred, or default QoS requirements for a service data session(s). In some embodiments, initial further availability (FA) negotiation for QoS data and/or QoS data control sessions may be conducted via a NAN datapath setup operation and/or a NDL scheduling operation and may be based on one or more of the initial QoS requirements, QoS capabilities, and/or NAN device capabilities. In some embodiments, a QoS Source NAN device may initiate NDL FA schedule negotiation with QoS support by including a QoS request in the FA negotiation messages.

In some embodiments, QoS may also be negotiated post NAN datapath setup. For example, detailed QoS requirements and/or capabilities may be exchanged and/or conducted via upper layers via a service data control session (such as RTSP) once the NAN devices have setup a datapath (e.g., have a communication schedule). Note that the upper layers may update a NAN schedule engine (e.g., a portion of software/hardware within a client station, such as client station 106, that may be dedicated to scheduling NAN datapaths and datalinks) with new QoS requirements for service data session(s) and respective NAN schedule engines for each NAN device may then renegotiate NDL FA schedules to meet the new QoS requirements. In some embodiments, a QoS source NAN device may initiate NDL FA schedule renegotiation with QoS support by including a QoS request in the FA update messages.

In some embodiments, QoS setup may be fully negotiated prior to setup of a NAN datapath. In other words, pre NAN datapath QoS negotiations may be completed during pre-NAN datapath setup. For example, initial QoS requirements and/or capabilities may be communicated (or conveyed) via any of a publish, a subscription, and/or a further service discovery message. In addition, detailed QoS requirement and/or capability exchange maybe conducted by further service discovery and FA negotiations for QoS data and/or QoS data control session(s) may be conducted via a NAN datapath setup operation and/or a NDL scheduling operation. For example, in some embodiments, a service and/or application of a QoS source NAN device may propose QoS requirement parameters including, but not limited to, user priority, service interval, data rate, delay bound, and/or burst size. In some embodiments, the user priority may be associated with an IEEE 802.1D user priority. In some embodiments, data rate may include one or more of a minimum data rate, a mean data rate, and/or a peak data rate. A QoS source device may also communicate and negotiate the QoS requirements with a peer QoS sink device.

Once the datapath has been setup, embodiments described herein may be implemented to maintain the datapath. For example, upper layers of a NAN device may request that a NAN schedule engine adjust an established NDL FA schedule to meet new service QoS requirements. Thus, as shown, a source device may send an NDL FA update message that may include an updated FA schedule proposal with a new QoS request, and a sink device may send a response to the updated FA schedule proposal. As another example, in response to radio resource changes, a NAN device may update the upper layers of the radio resource changes by issuing a datapath report event (e.g., due to newly added NDLs or NAN datapaths or due to channel condition changes) such that the upper layers may adjust (e.g., quickly or rapidly) to the radio resource changes, and issue updated QoS requirements to a NAN schedule engine.

In addition, once the datapath has been setup, embodiments described herein may be implemented to terminate the datapath. For example, in some embodiments, an upper layer may inform a NAN layer to end a datapath and release assigned radio resource(s). For example, a NAN schedule engine of a NAN device may transmit an NDL update message to a peer NAN device with an indication of a datapath or an NDL termination message and may also include an updated NDL FA schedule proposal. In some embodiments, the NAN layer may inform the upper layers of a possible break of a datapath or NDL by issuing a datapath report event, and, in response, the upper layers may retry or terminate the datapath. In some embodiments, a MAC traffic monitor may explicitly or implicitly inform the upper layers of datapath activity. For example, if a NAN device does not receive explicit keep-alive messages from a peer NAN device for a time-out period, the MAC traffic monitor may issue a datapath report to upper layers to explicitly report traffic conditions. Note that a NAN device with active datapaths may be requested to schedule a NAN data beacon transmission (broadcast) in every one or a few NDC base schedule windows and/or transmit keep-alive messages (unicast) periodically or reactively to an active NAN peer upon the request from the NAN peer. In addition, the keep-alive message may be requested by a NAN peer for a particular datapath associated with a particular service. As another example, the MAC traffic monitor may implicitly monitor traffic such that the NAN layer keeps monitoring data traffic and/or FA utilization from a NAN peer and may report abnormal conditions to upper layers (e.g. extremely low traffic for a specified period with very low FA utilization.

QoS Support—Setup

Figure 6:
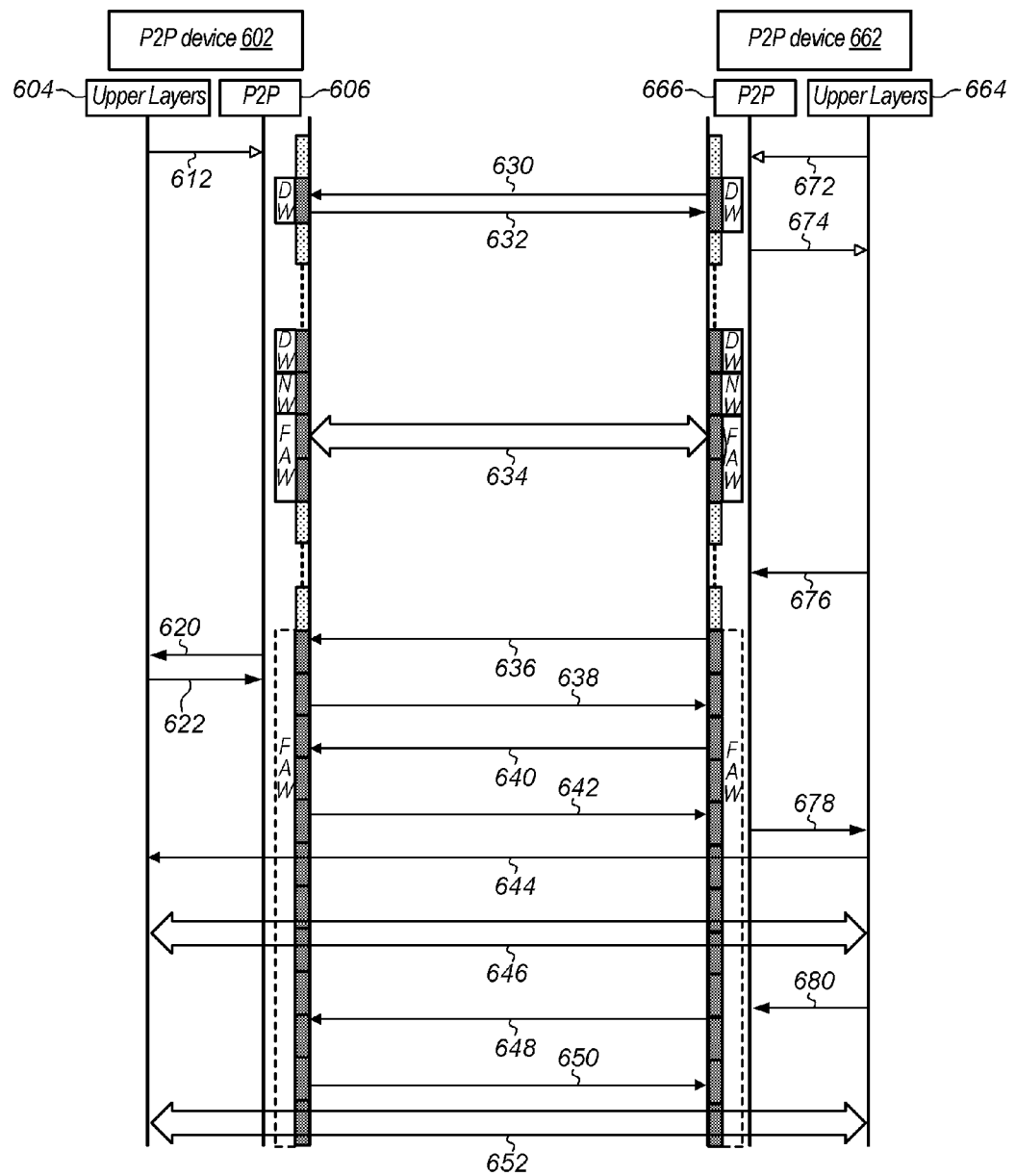
FIG. 6 illustrates an example of a signaling flow for a technique for supporting setup of a datapath that includes negotiation of QoS requirements, according to some embodiments.

FIG. 6 illustrates an example of signaling flow for a technique for supporting setup of a datapath that includes negotiation of QoS requirements, according to some embodiments. The signaling flow illustrated by FIG. 6 may be used in conjunction with any of the systems or devices shown in the above Figures, among other devices. In various embodiments, some of the signaling flow shown may be performed concurrently, in a different order than shown, or may be omitted. Additional signaling may also be performed as desired. As shown, the signaling flow may operate as follows.

At 612, an upper layers 604 (e.g., an application) of a P2P device 602 (which may be similar to or the same as client station 106 and/or AP 112 described above) may transmit a request to publish a service to a P2P layer 606 of P2P device 602. The request to publish may include QoS capabilities (or requirements) for the service. The P2P device 602 may be configured to operate according to a peer-to-peer protocol such as Wi-Fi direct, Apple wireless direct link (AWDL), and/or Neighbor Awareness Networking (NAN), among other peer-to-peer protocols. In other words, P2P layer 606 may be configured to communicate according to a peer-to-peer protocol such as Wi-Fi direct, AWDL, and/or NAN, among other peer-to-peer protocols.

Similarly, at 672, an upper layers 664 (e.g., an application) of a P2P device 662 (which may be similar to or the same as client station 106 and/or AP 112 described above) may transmit a request to subscribe to a service to a P2P layer 666 of P2P device 662. The request to subscribe may include initial QoS requirements. The initial QoS requirements may be based, at least in part, on QoS requirements for a service data control session and/or minimum, preferred, or default QoS requirements for a service data session. The P2P device 662 may be configured to operate according to a peer-to-peer protocol such as Wi-Fi direct, Apple wireless direct link (AWDL), and/or Neighbor Awareness Networking (NAN), among other peer-to-peer protocols. In other words, P2P layer 666 may be configured to communicate according to a peer-to-peer protocol such as Wi-Fi direct, AWDL, and/or NAN, among other peer-to-peer protocols.

At 630, P2P layer 666 may transmit message such as a service discovery frame (SDF) (e.g., an unsolicited subscribe request) to P2P layer 606. The message may include the initial QoS requirements received from upper layers 664.

At 632, P2P layer 632 may respond with a response message such as a publish frame. The response message may include device identity information as well as QoS capabilities as received from upper layers 604.

At 674, P2P layer 666 may transmit service discovery results to P2P layer 664. The service discovery results may include information received in the response message at 632. For example, the received information may include device identity information for P2P device 602 as well as QoS capabilities.

At 634, P2P layers 606 and 666 may perform further service discovery, e.g., to determine an initial schedule for a datapath.

At 676, upper layers 664, based on the further service discovery, may transmit a datapath request to P2P layer 666. The datapath request may include the initial QoS requirements.

At 636, P2P layer 666 may transmit a datapath request to P2P layer 606. The datapath request may include a further availability (FA) proposal (e.g., an initial schedule proposal for the communications) as well as a QoS request that may be based on the initial QoS requirements.

At 620, P2P layer 606 may transmit a datapath indication (e.g., based on the datapath request) to upper layers 604 and, at 622, may receive a datapath response from upper layers 604.

At 638, P2P layer 606 may transmit a datapath response to P2P layer 666. The datapath response may include a FA response (e.g., an acceptance of the initial schedule proposal or a counter proposal).

At 640 and 642 P2P layers 606 and 666 may exchange further messages to update FA for the communication (e.g., for a P2P data link connection).

At 678, P2P layer 666 may transmit a datapath confirmation message to upper layers 664 confirming setup of the datapath.

At 644, upper layers 664 may transmit a service data session (e.g. such as real time streaming protocol (RTSP)) setup request to upper layers 604 via the datapath connection between P2P devices 602 and 662.

At 646, upper layers 604 and 664 may negotiate the service data session capabilities, including detailed QoS requirements and capabilities negotiation. For example, in some embodiments, a service and/or application of a QoS source P2P device may propose QoS requirement parameters including, but not limited to, user priority, service interval, data rate, delay bound, and/or burst size. In some embodiments, the user priority may be associated with an IEEE 802.1D user priority. In some embodiments, data rate may include one or more of a minimum data rate, a mean data rate, and/or a peak data rate. A QoS source device may also communicate and negotiate the QoS requirements with a peer QoS sink device.

At 680, upper layers 664 may send a datapath update to P2P layers 666. The datapath update may include updated QoS requirements as negotiated at 646.

At 648, P2P layer 666 may transmit a FA update for the communication to P2P layer 606. The FA update may include an updated schedule as well as updated QoS requirements.

At 650, P2P layer 606 may transmit a FA update for the communication to P2P layer 666. The FA update may include a response to a proposed updated schedule, e.g., acceptance and/or a counter proposal.

At 652, the data session may commence, e.g., based on the updated QoS requirements.

Figure 7:
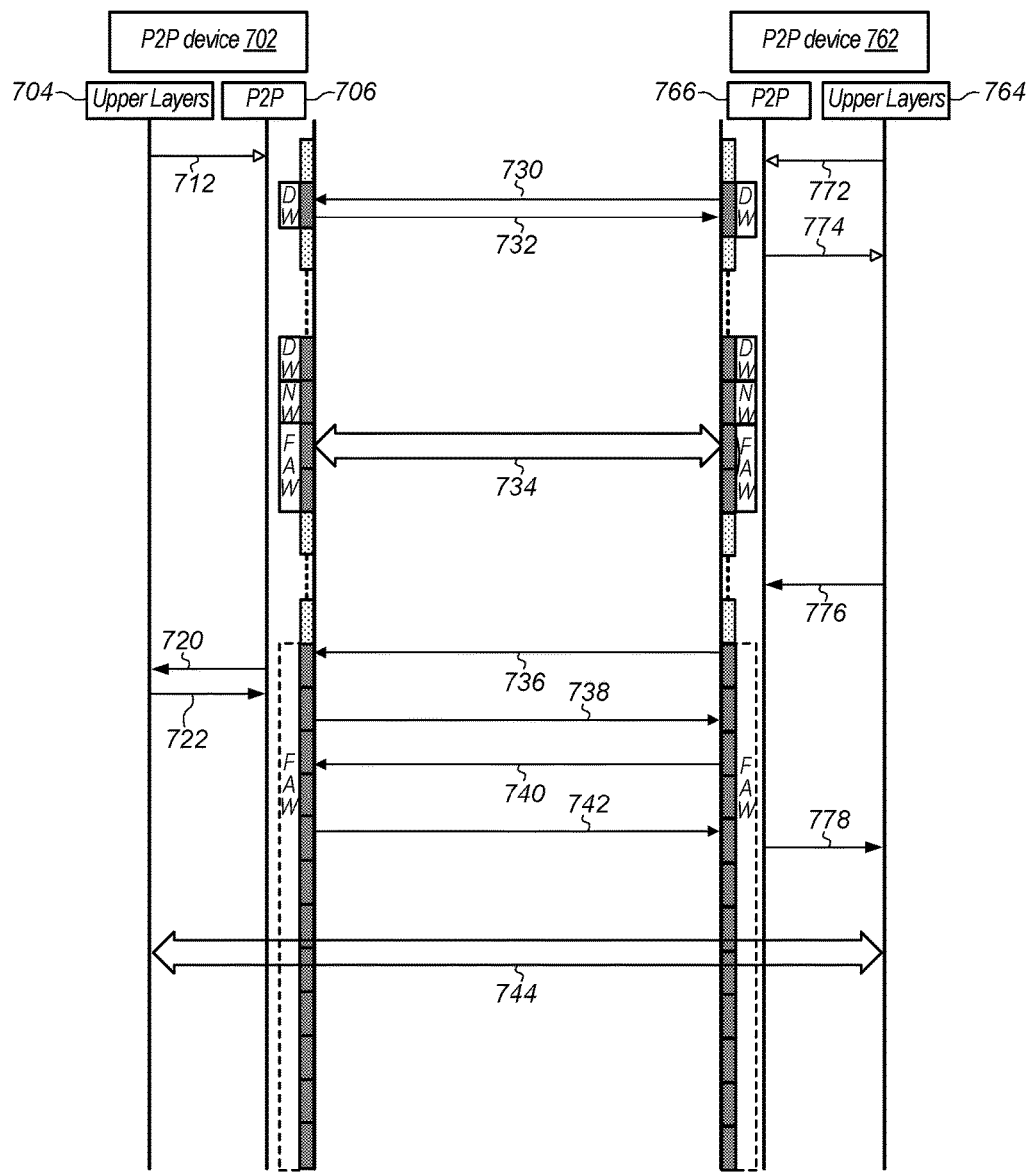
FIG. 7 illustrates an example of a signaling flow for a technique for QoS setup prior to setup of a peer-to-peer datapath, according to some embodiments.

FIG. 7 illustrates an example of a signaling flow for a technique for QoS setup prior to setup of a P2P datapath, according to some embodiments. The signaling flow illustrated by FIG. 7 may be used in conjunction with any of the systems or devices shown in the above Figures, among other devices. In various embodiments, some of the signaling flow shown may be performed concurrently, in a different order than shown, or may be omitted. Additional signaling may also be performed as desired. As shown, the signaling flow may operate as follows.

At 712, an upper layers 704 (e.g., an application) of a P2P device 702 (which may be similar to or the same as client station 106 and/or AP 112 described above) may transmit a request to publish a service to a P2P layer 706 of P2P device

702. The request to publish may include QoS capabilities (or requirements) for the service. The P2P device 702 may be configured to operate according to a peer-to-peer protocol such as Wi-Fi direct, Apple wireless direct link (AWDL), and/or Neighbor Awareness Networking (NAN), among other peer-to-peer protocols. In other words, P2P layer 706 may be configured to communicate according to a peer-to-peer protocol such as Wi-Fi direct, AWDL, and/or NAN, among other peer-to-peer protocols.

Similarly, at 772, an upper layers 764 (e.g., an application) of a P2P device 762 (which may be similar to or the same as client station 106 and/or AP 112 described above) may transmit a request to subscribe to a service to a P2P layer 766 of P2P device 762. The request to subscribe may include initial QoS requirements. The initial QoS requirements may be based, at least in part, on QoS requirements for a service data control session and/or minimum, preferred, or default QoS requirements for a service data session. The P2P device 762 may be configured to operate according to a peer-to-peer protocol such as Wi-Fi direct, Apple wireless direct link (AWDL), and/or Neighbor Awareness Networking (NAN), among other peer-to-peer protocols. In other words, P2P layer 766 may be configured to communicate according to a peer-to-peer protocol such as Wi-Fi direct, AWDL, and/or NAN, among other peer-to-peer protocols.

At 730, P2P layer 766 may transmit message such as a service discovery frame (SDF) (e.g., an unsolicited subscribe request) to P2P layer 706. The message may include the initial QoS requirements received from upper layers 764.

At 732, P2P layer 732 may respond with a response message such as a publish frame. The response message may include device identity information as well as QoS capabilities as received from upper layers 704.

At 774, P2P layer 766 may transmit service discovery results to P2P layer 764. The service discovery results may include information received in the response message at 732. For example, the received information may include device identity information for P2P device 702 as well as QoS capabilities.

At 734, P2P layers 706 and 766 may perform further service discovery, including detailed QoS requirements and capabilities negotiation. For example, in some embodiments, a service and/or application of a QoS source P2P device may propose QoS requirement parameters including, but not limited to, user priority, service interval, data rate, delay bound, and/or burst size. In some embodiments, the user priority may be associated with an IEEE 802.1D user priority. In some embodiments, data rate may include one or more of a minimum data rate, a mean data rate, and/or a peak data rate. A QoS source device may also communicate and negotiate the QoS requirements with a peer QoS sink device.

At 776, upper layers 764, based on the further service discovery, may transmit a datapath request to P2P layer 766. The datapath request may include QoS requirements as negotiated at 734.

At 736, P2P layer 766 may transmit a datapath request to P2P layer 706. The datapath request may include a further availability (FA) proposal (e.g., an initial schedule proposal for the communications) as well as a QoS request that may be based on the QoS requirements as negotiated at 734.

At 720, P2P layer 706 may transmit a datapath indication (e.g., based on the datapath request) to upper layers 704 and, at 722, may receive a datapath response from upper layers 704.

At 738, P2P layer 706 may transmit a datapath response to P2P layer 766. The datapath response may include a FA response (e.g., an acceptance of the initial schedule proposal or a counter proposal).

At 740 and 742 P2P layers 706 and 766 may exchange further messages to update FA for the communication (e.g., for a P2P data link connection).

At 778, P2P layer 766 may transmit a datapath confirmation message to upper layers 764 confirming setup of the datapath.

At 744, the data session may commence, e.g., based on the updated QoS requirements.

QoS Support—Maintenance

Figure 8:
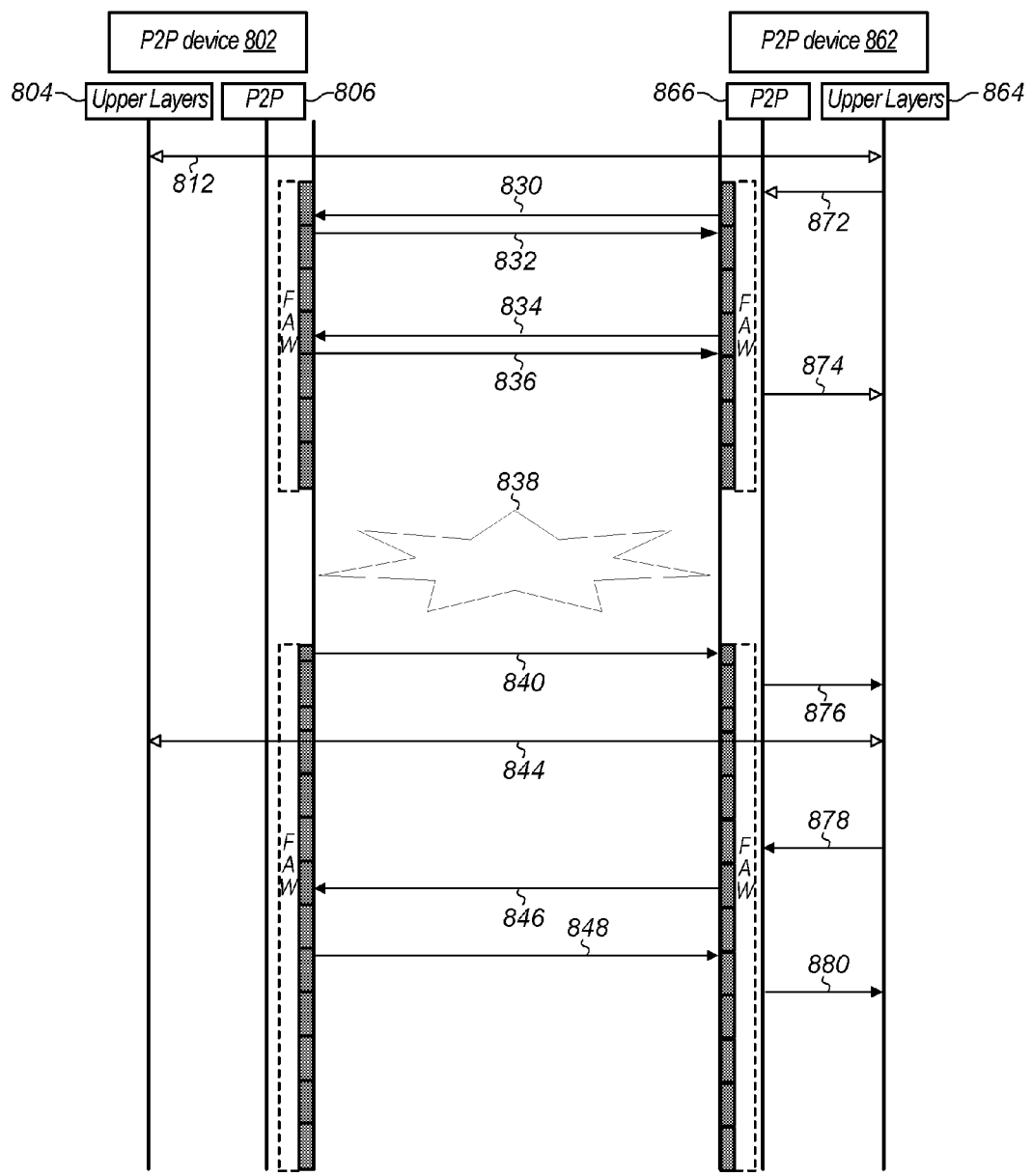
FIG. 8 illustrates an example of a signaling flow for a technique for maintaining peer-to-peer datapath QoS support, according to embodiments.

FIG. 8 illustrates an example of a signaling flow for a technique for maintaining peer-to-peer datapath QoS support, according to embodiments. The signaling flow illustrated by FIG. 8 may be used in conjunction with any of the systems or devices shown in the above Figures, among other devices. In various embodiments, some of the signaling flow shown may be performed concurrently, in a different order than shown, or may be omitted. Additional signaling may also be performed as desired. As shown, the signaling flow may operate as follows.

At 812, upper layers 804 (e.g., an application) of a P2P device 802 (which may be similar to or the same as client station 106 and/or AP 112 described above) may be in communication with upper layers 864 (e.g., an application) of a P2P device 862 (which may be similar to or the same as client station 106 and/or AP 112 described above) and the upper layers 804 and 864 may update one another with new (or updated) QoS requirements for an established datapath or data session. The P2P device 802 may be configured to operate according to a peer-to-peer protocol such as Wi-Fi direct, Apple wireless direct link (AWDL), and/or Neighbor Awareness Networking (NAN), among other peer-to-peer protocols. In other words, P2P layer 806 may be configured to communicate according to a peer-to-peer protocol such as Wi-Fi direct, AWDL, and/or NAN, among other peer-to-peer protocols. In addition, the P2P device 862 may be configured to operate according to a peer-to-peer protocol such as Wi-Fi direct, Apple wireless direct link (AWDL), and/or Neighbor Awareness Networking (NAN), among other peer-to-peer protocols. In other words, P2P layer 866 may be configured to communicate according to a peer-to-peer protocol such as Wi-Fi direct, AWDL, and/or NAN, among other peer-to-peer protocols.

At 872, upper layers 864 may transmit a datapath update message to the P2P layer 866 of P2P device 862. The datapath update message may include updated QoS requirements as determined at 812.

At 830, P2P layer 866 may transmit a further availability (FA) update (e.g., a future availability schedule) to P2P layer 806. The FA update may include an updated schedule proposal with a new (or updated) QoS request.

At 832, P2P layer 832 may respond with a FA update that may include a response, e.g., acceptance of the updated schedule proposal and/or QoS request and/or a counter proposal.

At 834 and 836 P2P layers 806 and 866 may exchange further messages to update FA for the communication (e.g., for a data link connection).

At 874, P2P layer 866 may transmit a datapath confirmation message to upper layers 864 confirming update of the datapath.

At 838, radio resources for P2P devices 802 and 862 may be updated based on the updated QoS requirements and FA schedules.

At 840, P2P layer 806 may send another FA update to P2P layer 866 and P2P layer 866 may send a datapath report message to upper layers 864 at 876. The datapath report may include negotiated FA schedules (e.g., updated FA).

At 844, upper layers 804 and 864 may re-negotiate (or update) service data session capabilities, including detailed QoS requirements and capabilities. In other words, upper layers 804 and 864 may negotiate or adapt current QoS requirements for the service data session based on the updated QoS requirements. For example, in some embodiments, a service and/or application of a QoS source P2P device may propose updated QoS requirement parameters including, but not limited to, user priority, service interval, data rate, delay bound, and/or burst size. In some embodiments, the user priority may be associated with an IEEE 802.1D user priority. In some embodiments, data rate may include one or more of a minimum data rate, a mean data rate, and/or a peak data rate. A QoS source device may also communicate and negotiate the QoS requirements with a peer QoS sink device.

At 878, upper layers 864 may send a datapath update to P2P layers 866. The datapath update may include updated QoS requirements as negotiated at 844.

At 846, P2P layer 866 may transmit a FA update proposal for the communication to P2P layer 806. The FA update may include an updated schedule as well as the updated (or new) QoS requirements.

At 848, P2P layer 806 may transmit a datapath response to P2P layer 866. The datapath response may include a FA response (e.g., an acceptance of the schedule proposal or a counter proposal).

At 880, P2P layer 866 may transmit a datapath confirmation message to upper layers 864 confirming setup of the datapath.

QoS Support—Terminations

Figure 9:
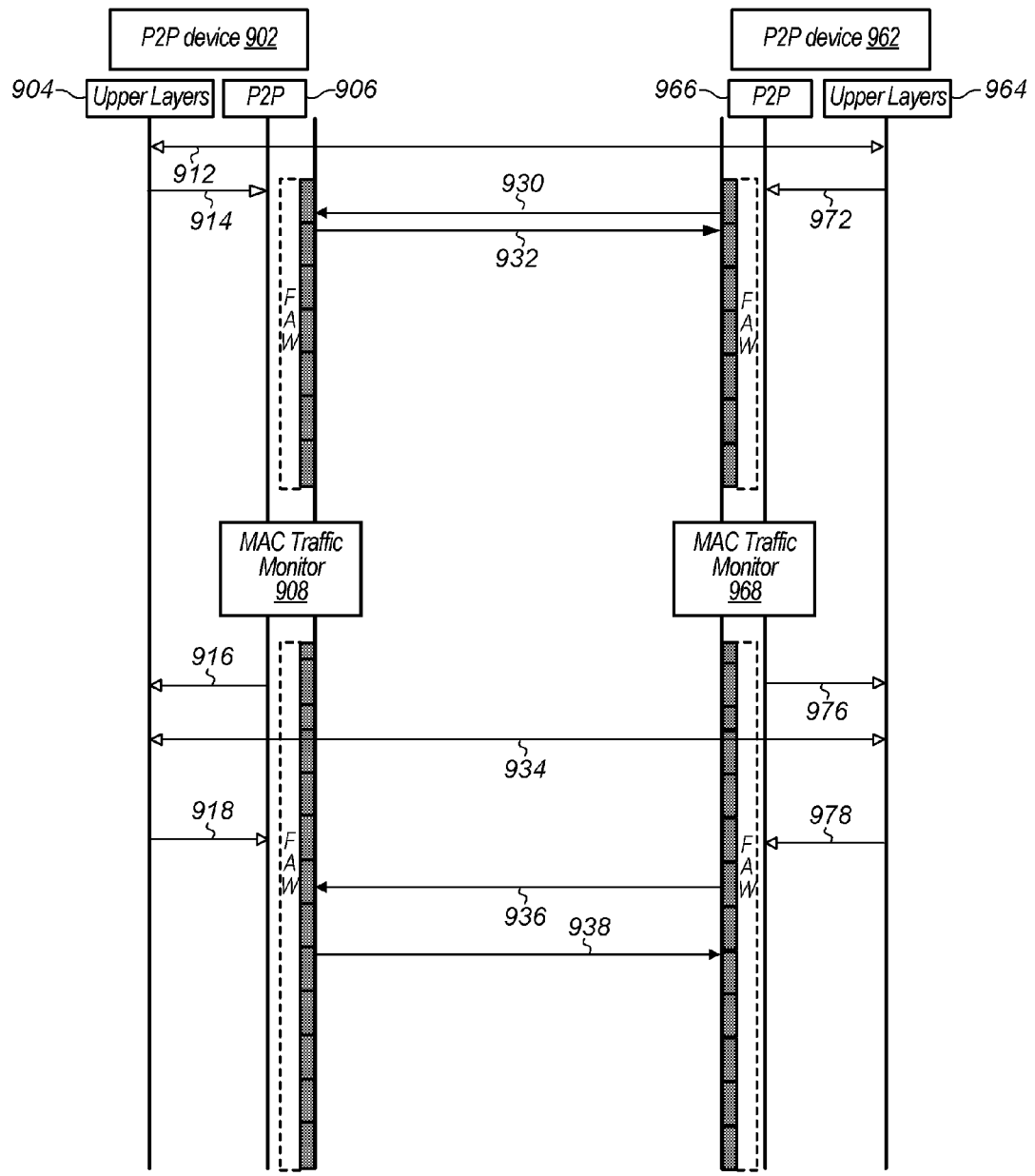
FIG. 9 illustrates an example of a signaling flow for a technique for terminating a peer-to-peer datapath, according to embodiments.

FIG. 9 illustrates an example of a signaling flow for a technique for terminating a peer-to-peer datapath, according to embodiments. The signaling flow illustrated by FIG. 9 may be used in conjunction with any of the systems or devices shown in the above Figures, among other devices. In various embodiments, some of the signaling flow shown may be performed concurrently, in a different order than shown, or may be omitted. Additional signaling may also be performed as desired. As shown, the signaling flow may operate as follows.

At 912, upper layers 904 (e.g., an application) of a P2P device 902 (which may be similar to or the same as client station 106 and/or AP 112 described above) may be in communication with upper layers 964 (e.g., an application) of a P2P device 962 (which may be similar to or the same as client station 106 and/or AP 112 described above) and one of the upper layers 904 and 964 may notify the other one of upper layers 904 and 964 that the data session may be terminated. The P2P device 902 may be configured to operate according to a peer-to-peer protocol such as Wi-Fi direct, Apple wireless direct link (AWDL), and/or Neighbor Awareness Networking (NAN), among other peer-to-peer protocols. In other words, P2P layer 906 may be configured to communicate according to a peer-to-peer protocol such as Wi-Fi direct, AWDL, and/or NAN, among other peer-to-peer protocols. In addition, the P2P device 962 may be configured to operate according to a peer-to-peer protocol such as Wi-Fi direct, Apple wireless direct link (AWDL), and/or Neighbor Awareness Networking (NAN), among other peer-to-peer protocols. In other words, P2P layer 966 may be configured to communicate according to a peer-to-peer protocol such as Wi-Fi direct, AWDL, and/or NAN, among other peer-to-peer protocols.

At 914, upper layers 904 may transmit a datapath end message to the P2P layer 906. Similarly, at 972, upper layers 964 may transmit a datapath end message to the P2P layer 966 of P2P device 962.

At 930, P2P layer 966 may transmit a further availability (FA) update (e.g., a future availability schedule) to P2P layer 906. The FA update may include a datapath termination request.

At 932, P2P layer 932 may respond with a FA update that may include a response, e.g., acceptance of the datapath termination request.

At 908 and 968, respective medium access control (MAC) traffic monitors may monitor traffic. At 934 and 936 P2P layers 906 and 966 may exchange further messages to update FA for the communication (e.g., for a data link connection).

At 916, if P2P layer 906 does not receive explicit keep-alive messages from P2P layer 966 for a time-out period, the MAC traffic monitor may issue a datapath report to upper layers to explicitly report traffic conditions. Note that in some embodiments, a P2P device with active datapaths may be requested to schedule a P2P data beacon transmission (broadcast) in every one or a few transmission windows and/or transmit keep-alive messages (unicast) periodically or reactively to an active P2P peer upon the request from the P2P peer. In addition, the keep-alive message may be requested by a P2P peer for a particular datapath associated with a particular service. As another example, the MAC traffic monitor may implicitly monitor traffic such that the P2P layer 906 continues monitoring data traffic and/or FA utilization from the P2P layer 966 and may report abnormal conditions to upper layers 904 (e.g. extremely low traffic for a specified period with very low FA utilization).

Similarly, at 976, if P2P layer 966 does not receive explicit keep-alive messages from P2P layer 906 for a time-out period, the MAC traffic monitor may issue a datapath report to upper layers to explicitly report traffic conditions. Note that in some embodiments, a P2P device with active datapaths may be requested to schedule a P2P data beacon transmission (broadcast) in every one or a few transmission windows and/or transmit keep-alive messages (unicast) periodically or reactively to an active P2P peer upon the request from the P2P peer. In addition, the keep-alive message may be requested by a P2P peer for a particular datapath associated with a particular service. As another example, the MAC traffic monitor may implicitly monitor traffic such that the P2P layer 966 continues monitoring data traffic and/or FA utilization from the P2P layer 906 and may report abnormal conditions to upper layers 964 (e.g. extremely low traffic for a specified period with very low FA utilization).

At 934, upper layers 904 may exchange messages with upper layers 964 and may attempt to re-establish and/or terminate the data session.

At 918, upper layers 904 may transmit a datapath end message to P2P layer 906. Similarly, at 978, upper layers 964 may transmit a datapath end message to P2P layer 966.

At 936, P2P layer 966 may transmit a FA update message to P2P layer 906 which may include an indication of datapath and/or data session termination. Similarly, at 938, P2P layer 906 may transmit a FA update message to P2P layer 966 which may include an indication of datapath and/or data session termination.

QoS Support—Further Availability Schedule

Figure 10A:
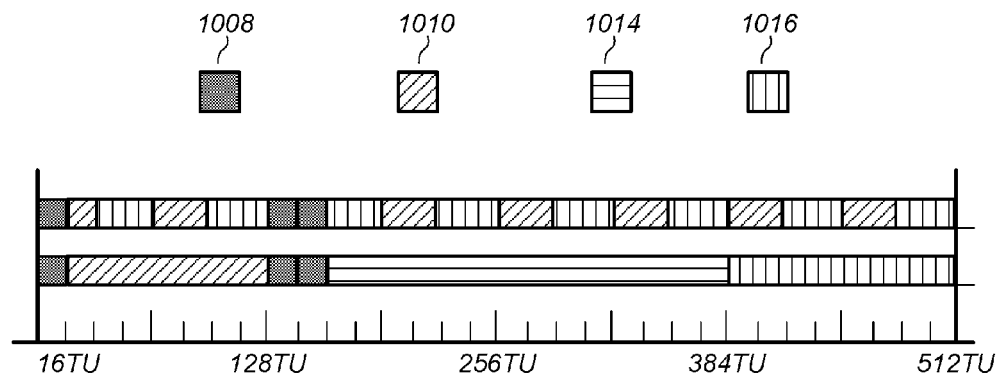
FIG. 10A illustrates a further availability (FA) schedule for a NAN data link (NDL), according to the prior art.

FIG. 10A illustrates a further availability (FA) schedule for a NAN data link (NDL), according to the prior art. As shown an NDL FA schedule, excluding discover windows (DWs), may include NAN data cluster base schedule time slots 1008, NDL immutable schedule time slots 1010, and NDL flexible schedule time slots 1014 and 1016. The NAN data cluster base schedule time slots 1008 may be for a common schedule for a NAN data cluster in which the NDL is included. The NDL immutable schedule time slots 1010 may be a portion of the NDL schedule determined by an NDL scheduler and not changeable (i.e., non-negotiable) by an NDL non-scheduler. The NDL flexible schedule time slots 1014 and 1016 may be a portion of the NDL schedule that may be changeable (i.e., negotiable) by the NDL scheduler and the NDL non-scheduler.

Figure 10B:
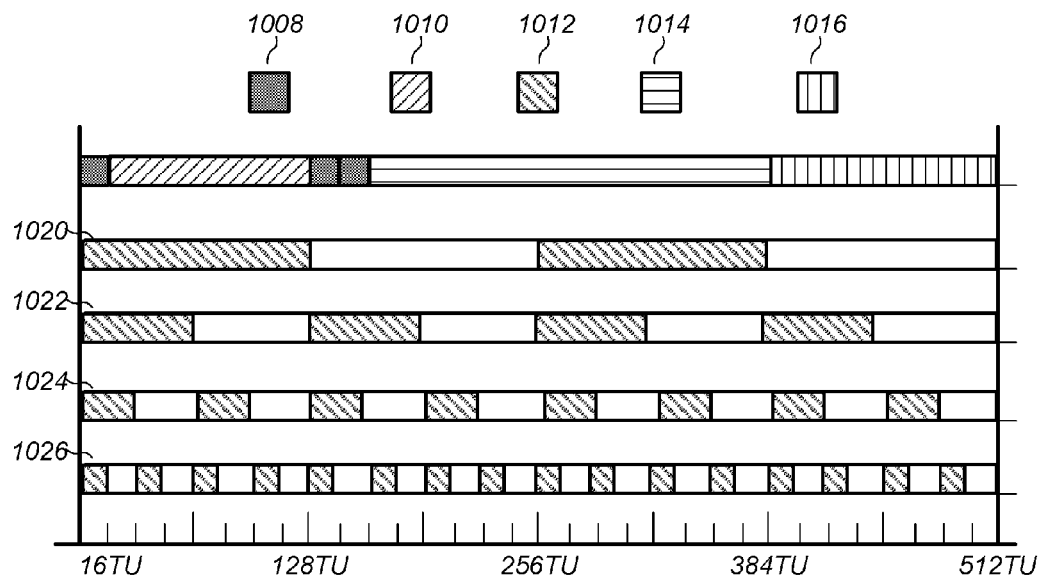
FIG. 10B illustrates an example of a NDL FA schedule with a QoS request, according to some embodiments.

FIG. 10B illustrates an example of a NDL FA schedule with a QoS request, according to some embodiments. The QoS request may be generated by a NAN schedule engine based on QoS requirements from service(s), and may indicate the required FA slot allocations in order to meet the service's QoS requirements. In some embodiments, a QoS request may include any of a minimum number of slots needed within a period, a maximum gap between two contiguous NDL blocks, and a minimum and/or preferred size of an NDL block. Note that a slot may be 16 time units (TUs) each and a period may include one or more DW intervals. Further, in some embodiments, an NDL time block may include one or more FA 16 TU slots. In addition, if an NDL time block includes two or more FA slots, the included slots may be contiguous in time. Additionally, the minimum and/or preferred size may be specified in either or both of a time duration and a bandwidth. Example schedules 1020, 1022, 1024, and 1026 illustrate various possibilities for QoS time slots 1012 specification, according to embodiments.

QoS Support—Negotiation Protocols

In some embodiments, a QoS negotiation between NAN peer devices may involve various levels of decision making and device roles. For example, a first NAN peer device may be a display (e.g., a monitor, TV, act.) and a second NAN peer device may be a client station (e.g., a UE or client station, such as client station 106 and/or AP 112). The first NAN peer device (e.g., the display) may have roles of publisher, datapath responder, QoS sink, and non-scheduler whereas the second NAN device (e.g., the client station) may have roles of subscriber, datapath initiator, QoS source, and scheduler. Note that a publisher may receive a publish method call and may transmit a publish message and a subscriber may receive a subscribe method and may scan for a publish message. In addition, a datapath initiator may receive a datapath request method call and may transmit a datapath request message and a datapath responder may receive a datapath request message and may respond with a datapath response message. Further, a QoS source may transmit service data with particular (or certain) QoS requirement and may make final QoS decision and a QoS sink may receive service data with particular (or certain) QoS capabilities. Additionally, a scheduler may have a higher scheduler rank (and thus, higher schedule restrictions) and may make final NDL schedule decision and a non-scheduler may have a lower scheduler rank (and thus, lower schedule restrictions) and may not make final NDL schedule decision.

Figure 11:
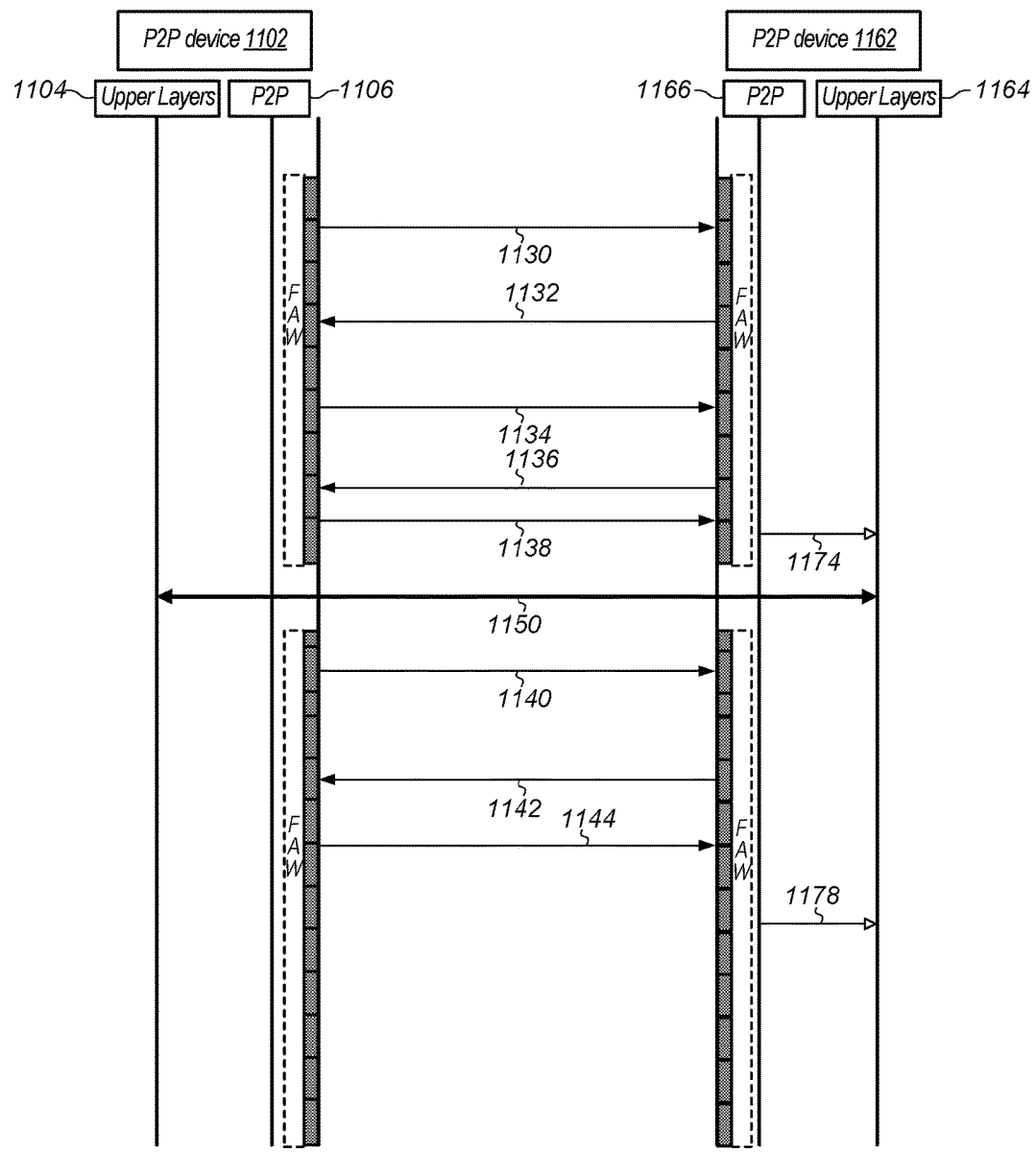
FIG. 11 illustrates an example of a signaling flow between peer-to-peer devices for FA QoS negotiation according to some embodiments.
Figure 12:
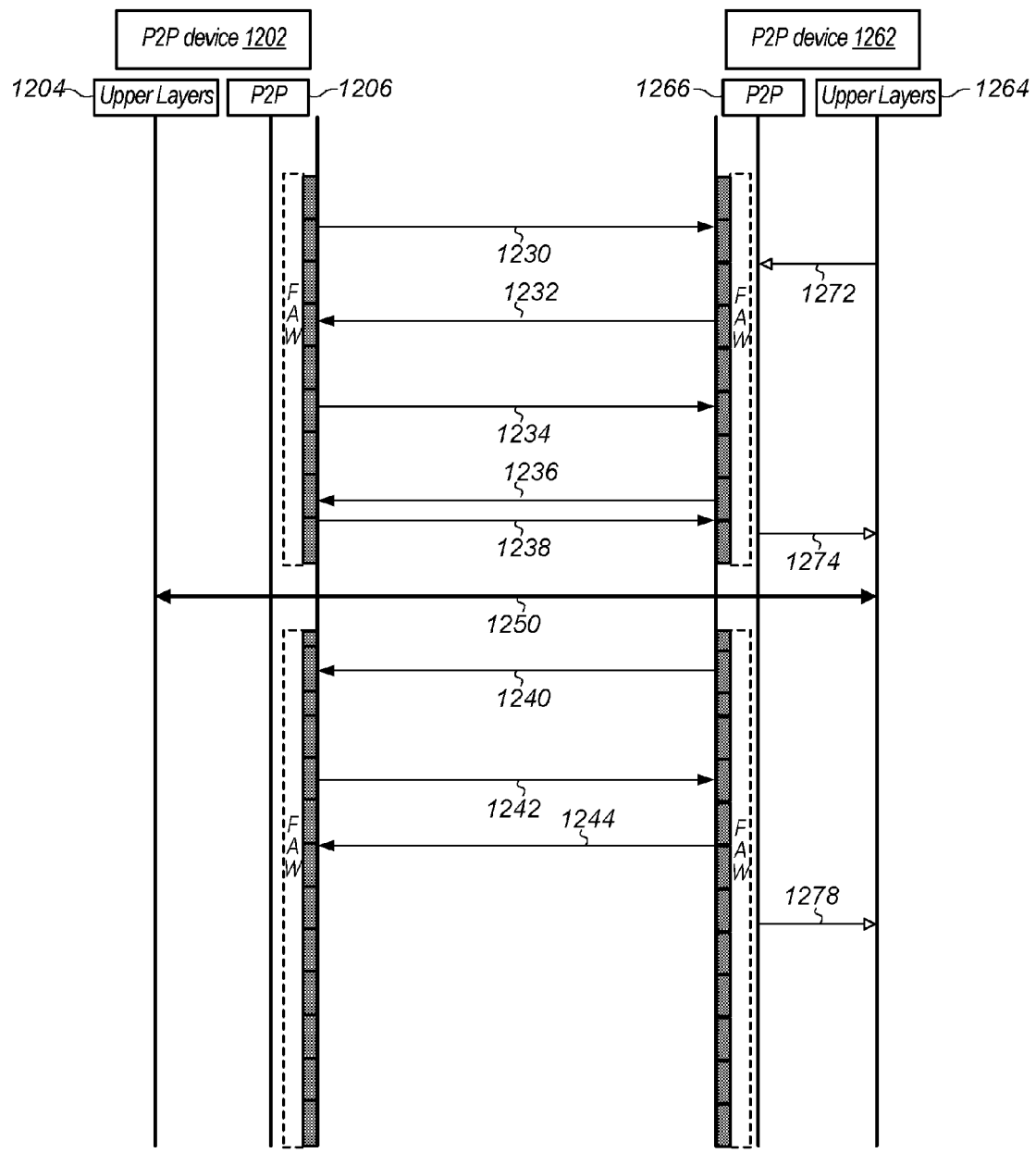
FIG. 12 illustrates an example of a signaling flow between peer-to-peer devices for FA QoS negotiation according to some embodiments.
Figure 13:
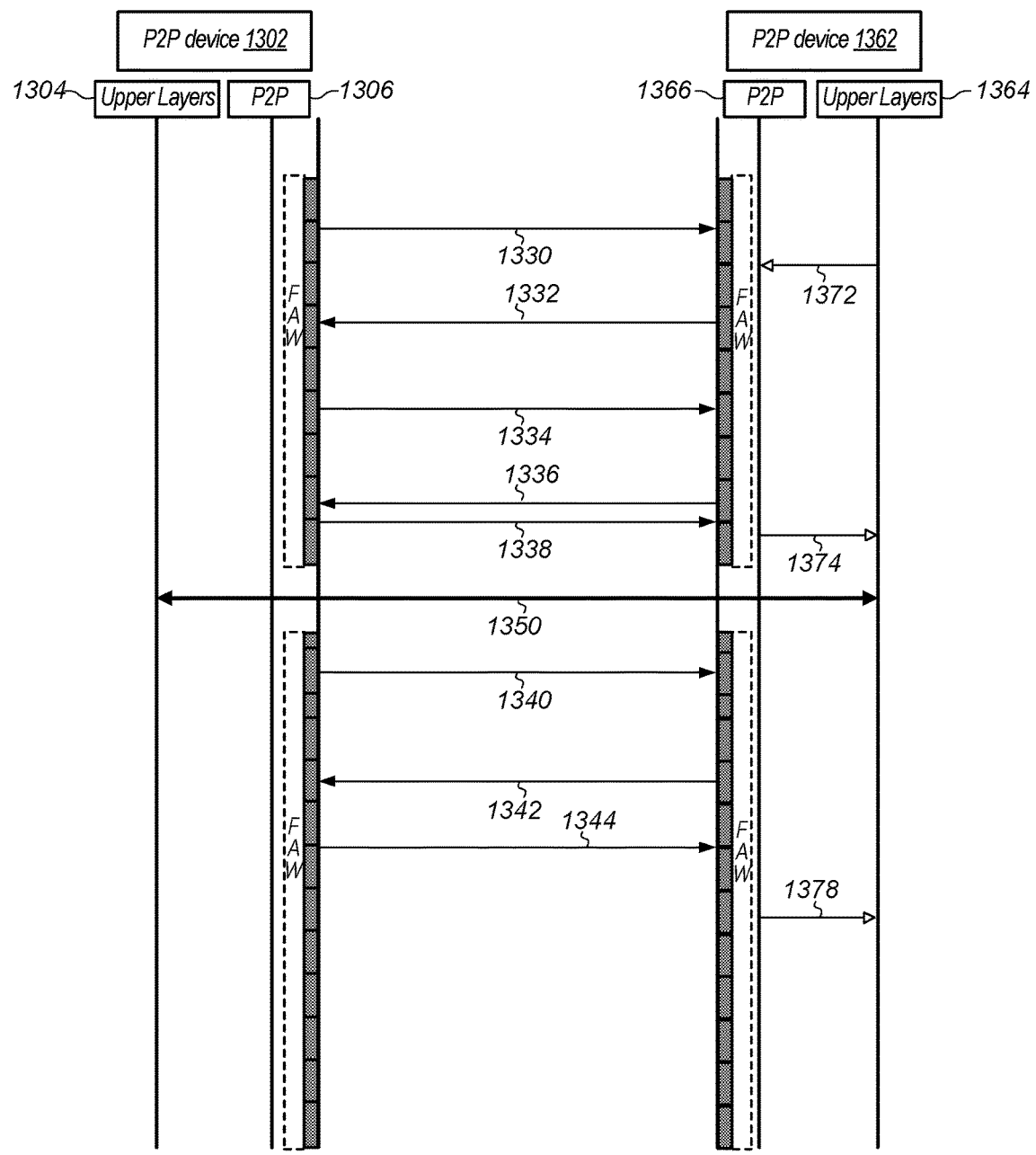
FIG. 13 illustrates an example of a signaling flow between peer-to-peer devices for FA QoS negotiation according to some embodiments.
Figure 14:
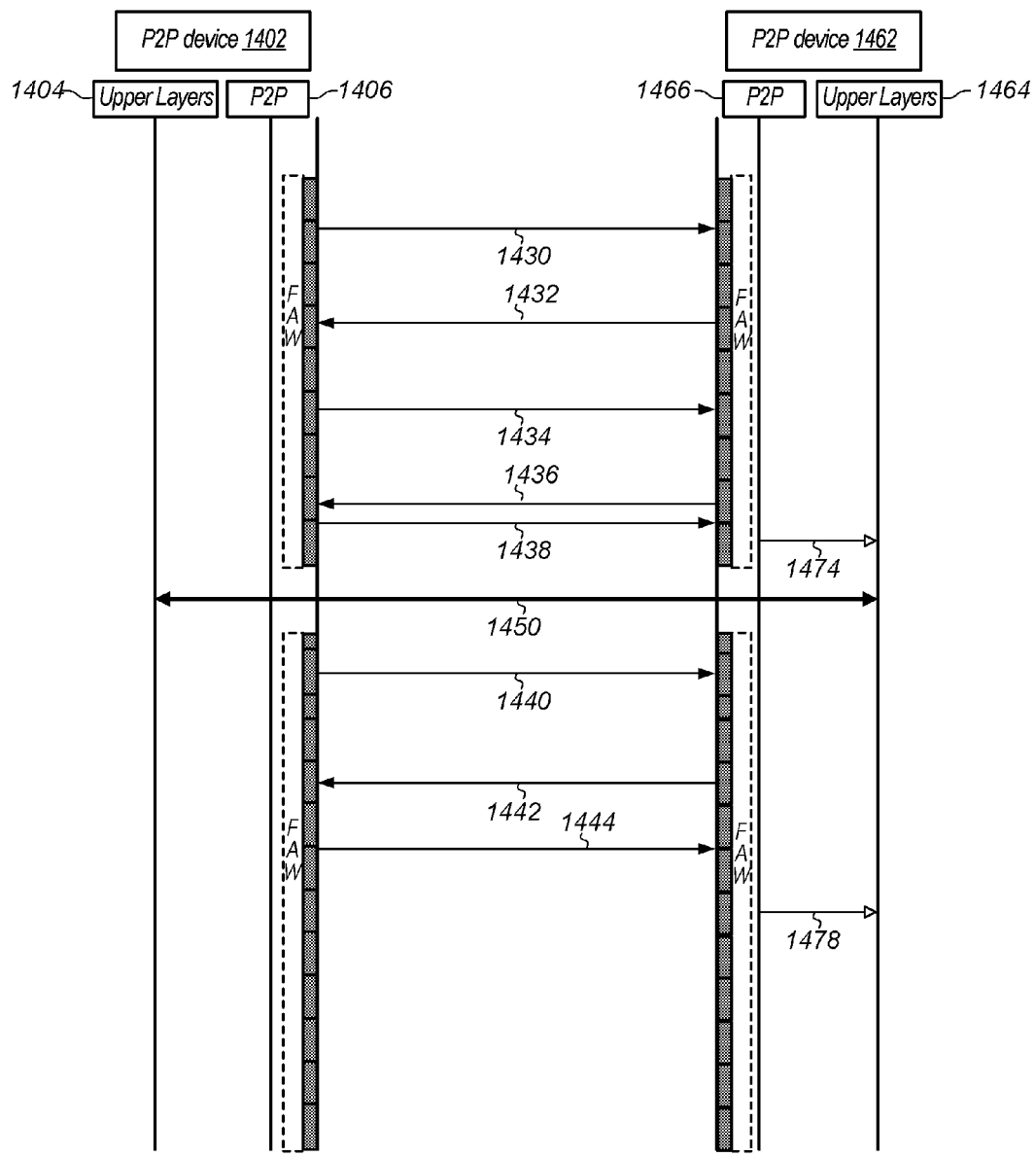
FIG. 14 illustrates an example of a signaling flow between peer-to-peer devices for FA QoS negotiation according to some embodiments.

FIGS. 11-14 illustrate signaling that may occur during FA QoS negotiations for various scenarios, according to embodiments. For example, FIG. 11 illustrates a scenario in which a first P2P device is a non-scheduler, QoS sink, datapath responder, and publisher and a second P2P device is a scheduler, QoS source, datapath initiator, and subscriber. FIG. 12 illustrates a scenario in which a first P2P device is a scheduler, QoS sink, datapath responder, and publisher and a second P2P device is a non-scheduler, QoS source, datapath initiator, and subscriber. FIG. 13 illustrates a scenario in which a first P2P device is a non-scheduler, QoS source, datapath responder, and publisher and a second P2P device is a scheduler, QoS sink, datapath initiator, and subscriber. FIG. 14 illustrates a scenario in which a first P2P device is a scheduler, QoS source, datapath responder, and publisher and a second P2P device is a non-scheduler, QoS sink, datapath initiator, and subscriber.

FIG. 11 illustrates an example of a signaling flow between peer-to-peer devices for FA QoS negotiation according to some embodiments. The signaling flow illustrated by FIG. 11 may be used in conjunction with any of the systems or devices shown in the above Figures, among other devices. In various embodiments, some of the signaling flow shown may be performed concurrently, in a different order than shown, or may be omitted. Additional signaling may also be performed as desired. As shown, the signaling flow may operate as follows.

At 1130, P2P device 1102 (non-scheduler, QoS sink, datapath responder, publisher) may send a publish message to P2P device 1162 (scheduler, QoS source, datapath initiator, subscriber). The publish message may include FA preferences and limitations, including scheduler rank of P2P device 1102. In other words, a P2P layer 1106 of P2P device 1102 may transmit a message to P2P layer 1166 of P2P device 1162. Note that The P2P device 1102 (which may be similar to or the same as client station 106 and/or AP 112 described above) may be configured to operate according to a peer-to-peer protocol such as Wi-Fi direct, Apple wireless direct link (AWDL), and/or Neighbor Awareness Networking (NAN), among other peer-to-peer protocols. In other words, P2P layer 1106 may be configured to communicate according to a peer-to-peer protocol such as Wi-Fi direct, AWDL, and/or NAN, among other peer-to-peer protocols. Note additionally that P2P device 1162 (which may be similar to or the same as client station 106 and/or AP 112 described above) may be configured to operate according to a peer-to-peer protocol such as Wi-Fi direct, Apple wireless direct link (AWDL), and/or Neighbor Awareness Networking (NAN), among other peer-to-peer protocols. In other words, P2P layer 1166 may be configured to communicate according to a peer-to-peer protocol such as Wi-Fi direct, AWDL, and/or NAN, among other peer-to-peer protocols.

At 1132, P2P layer 1166 may transmit a datapath request message to P2P layer 1106. The datapath request message may be sent subsequent to P2P layer 1166 receiving a datapath request message (or call), including QoS requirements, from upper layers 1164. The datapath request message may include FA preference and limitations, including scheduler rank of P2P device 1162. In addition, the datapath request message may include a datalink (e.g., NAN datalink) FA schedule proposal. The datalink FA schedule proposal may include a FA slot allocation (which, in some embodiments, may be effective immediately or at a future time), a data cluster base schedule, and datalink immutable/flexible schedules. In addition, since P2P device 1162 is the QoS Source device, the datapath request message may include a datapath QoS request field to indicate the required FA slot allocations in order to meet the QoS requirements from upper layers 1164.

At 1134, P2P layer 1106 may transmit a datapath response message to P2P layer 1166. The datapath response message may accept or reject the datalink FA schedule proposed by P2P layer 1166. If the datapath response message accepts the datalink FA schedule, the datapath response message may include a compliant FA schedule including a FA slot allocation with a same effective time as P2P device 1162, a same data cluster base schedule and datalink immutable schedule and a datalink flexible schedule that may be partially overlapped with the P2P device 1162's flexible schedule, but may ensure that overlapped slots of the two FA schedules meet the datapath QoS request. If the datapath response message rejects the datalink FA schedule, the datapath response message may include a counter FA schedule including a preferred FA slot allocation, a preferred data cluster base schedule, a datalink immutable schedule for P2P device 1102, and a datalink flexible schedule for P2P device 1102. Note that if P2P device 1102 rejects the datalink FA schedule proposed by P2P device 1162, then P2P device 1102 may not need to be present at the FA slots indicated by the datalink FA schedule proposed by P2P device 1162. Also, P2P device 1102 may not need to be present at FA slots indicated by the preferred FA slots in its own counter FA schedule, since the counter FA schedule simply serves as a suggestion, instead of a real commitment. In addition, schedules preferred by P2P device 1102 may be different from schedules preferred by P2P device 1162 and may not meet the datapath QoS request.

At 1136, P2P device 1162 may send an NDL FA update message to P2P device 1102 which may carry updated NDL FA schedule information in a format that may be the same as the datapath request message sent in step 1. Note that P2P device 1162 may use the NDL FA update message to convey an updated NDL FA proposal based on P2P device 1102's response, which may either be a complaint FA schedule or a counter FA schedule.

At 1138, P2P layer 1106 may transmit a datalink FA update message to P2P layer 1166 which may carry an updated response including P2P device 1162's updated datalink FA schedule and/or a response to P2P device 1162's updated NDL FA schedule proposal in a format that may be the same as the datapath response message transmitted in at 1134.

At 1150, upper layers 1104 and 1164 may update service data session capabilities, including detailed QoS requirements and capabilities. In other words, upper layers 1104 and 1164 may negotiate or adapt current QoS requirements for the service data session based on the QoS requirements. For example, in some embodiments, a service and/or application of a QoS source P2P device may propose updated QoS requirement parameters including, but not limited to, user priority, service interval, data rate, delay bound, and/or burst size. In some embodiments, the user priority may be associated with an IEEE 802.1D user priority. In some embodiments, data rate may include one or more of a minimum data rate, a mean data rate, and/or a peak data rate. A QoS source device may also communicate and negotiate the QoS requirements with a peer QoS sink device.

At 1140, subsequent to upper layers QoS requirement updates at 1150, P2P layer 1106 may send another FA update message to P2P layer 1166 similar to the FA update message sent at 1138. P2P layer 1106 may use this FA update message to convey an updated response to the P2P Device 1162's current FA schedule.

At 1142, P2P layer 1166 may send another FA update message to P2P layer 1106 similar to the FA update message sent at 1136. In addition, P2P layer 1166 may use this FA update message to convey a new schedule proposal with a QoS request, e.g., based on (at least in part) P2P device 1102's new response, and/or based (at least in part) on the new QoS requirements negotiated by upper layers 1104 and 1164.

At 1144, P2P layer 1106 may send another FA update to P2P layer 1166 similar to the FA updates sent at 1138 and 1140. P2P layer 1106 may use this FA update message to convey a response to device 1102's new schedule proposal.

Once P2P device 1162 collects sufficient FA schedule responses from P2P device 1102, e.g. after 1138 or 1144, P2P device 1162 may confirm the datapath with a datapath confirm event from the P2P layer 1166 to the upper layers 1166, e.g., as shown at 1174 and/or 1178.

FIG. 12 illustrates an example of a signaling flow between peer-to-peer devices for FA QoS negotiation according to some embodiments. The signaling flow illustrated by FIG. 12 may be used in conjunction with any of the systems or devices shown in the above Figures, among other devices. In various embodiments, some of the signaling flow shown may be performed concurrently, in a different order than shown, or may be omitted. Additional signaling may also be performed as desired. As shown, the signaling flow may operate as follows.

At 1230, P2P device 1202 (scheduler, QoS sink, datapath responder, publisher) may send a publish message to P2P device 1262 (non-scheduler, QoS source, datapath initiator, subscriber). The publish message may include FA preferences and limitations, including scheduler rank of P2P device 1202. In other words, a P2P layer 1206 of P2P device 1202 may transmit a message to P2P layer 1266 of P2P device 1262. Note that The P2P device 1202 (which may be similar to or the same as client station 106 and/or AP 112 described above) may be configured to operate according to a peer-to-peer protocol such as Wi-Fi direct, Apple wireless direct link (AWDL), and/or Neighbor Awareness Networking (NAN), among other peer-to-peer protocols. In other words, P2P layer 1206 may be configured to communicate according to a peer-to-peer protocol such as Wi-Fi direct, AWDL, and/or NAN, among other peer-to-peer protocols. Note additionally that P2P device 1262 (which may be similar to or the same as client station 106 and/or AP 112 described above) may be configured to operate according to a peer-to-peer protocol such as Wi-Fi direct, Apple wireless direct link (AWDL), and/or Neighbor Awareness Networking (NAN), among other peer-to-peer protocols. In other words, P2P layer 1266 may be configured to communicate according to a peer-to-peer protocol such as Wi-Fi direct, AWDL, and/or NAN, among other peer-to-peer protocols.

At 1232, P2P layer 1266 may send a datapath request message to P2P layer 1206. The datapath request message may be sent subsequent to P2P layer 1266 receiving a datapath request message (or call), including QoS requirements from upper layers 1264 at 1272. The datapath request message may include FA preference and limitations, including scheduler rank of P2P device 1262. In addition, the datapath request message may include a preliminary FA schedule proposal. Note that P2P device 1262 is a non-scheduler for the data link, so P2P device 1262 may not decide the final FA schedule. P2P layer 1266 may use the preliminary FA schedule proposal to indicate P2P device 1262's preferences and help (e.g., assist or aid) P2P device 1202 (e.g., the scheduler) to select a proper FA schedule. The preliminary FA schedule proposal may be effective immediately or at a future time (e.g., a preferred proposal). In addition, since P2P device 1262 is the QoS Source, P2P layer 1266 may include a datapath QoS request that is based (at least in part) on upper layers 1264 QoS requirements in the datapath request message transmitted to P2P layer 1206.

At 1234, P2P layer 1206 may send a datapath response message to P2P layer 1266. Since P2P device 1202 is the scheduler for the data link, P2P layer 1206 may include a formal FA schedule proposal in the datapath response message. The formal FA schedule may meet the datapath QoS request from P2P device 1262.

At 1236, P2P layer 1266 may send an FA update message to P2P layer 1206 which may either accept or reject the FA schedule proposal of P2P layer 1206. If P2P layer 1266 accepts the FA schedule proposal, the FA update may include a compliant FA schedule. If P2P layer 1266 rejects the FA schedule proposal, the FA update may include a counter FA schedule proposal.

At 1238, P2P layer 1206 may send an FA update message to P2P layer 1266 which may include (or carry) an updated FA schedule proposal based on P2P layer 1266's response at 1236.

At 1250, upper layers 1204 and 1264 may update service data session capabilities, including detailed QoS requirements and capabilities. In other words, upper layers 1204 and 1264 may negotiate or adapt current QoS requirements for the service data session based on the QoS requirements. For example, in some embodiments, a service and/or application of a QoS source P2P device may propose updated QoS requirement parameters including, but not limited to, user priority, service interval, data rate, delay bound, and/or burst size. In some embodiments, the user priority may be associated with an IEEE 802.1D user priority. In some embodiments, data rate may include one or more of a minimum data rate, a mean data rate, and/or a peak data rate. A QoS source device may also communicate and negotiate the QoS requirements with a peer QoS sink device.

At 1240, subsequent to upper layers QoS requirement updates at 1250, P2P layer 1266 may send another FA update message to P2P layer 1206 which may include an updated QoS request and an updated preliminary FA schedule proposal.

At 1242, P2P layer 1206 may send another FA update message to P2P layer 1266 which may include an updated formal FA schedule proposal based (at least in part) on FA update message received at 1240.

At 1244, P2P layer 1266 may send another FA update message to P2P layer 1206 which may either accept or reject the updated FA schedule proposal of P2P layer 1206. If P2P layer 1266 accepts the updated FA schedule proposal, the FA update may include a compliant FA schedule. If P2P layer 1266 rejects the updated FA schedule proposal, the FA update may include a counter FA schedule proposal.

Once P2P layer 1266 collects sufficient FA schedule responses from P2P layer 1206, e.g. after 1238 or step 1244, P2P layer 1266 may confirm the datapath with a datapath confirm message (or event) from the P2P layer 1266 to the upper layers 1264, e.g., at 1274 or 1278.

FIG. 13 illustrates an example of a signaling flow between peer-to-peer devices for FA QoS negotiation according to some embodiments. The signaling flow illustrated by FIG. 13 may be used in conjunction with any of the systems or devices shown in the above Figures, among other devices. In various embodiments, some of the signaling flow shown may be performed concurrently, in a different order than shown, or may be omitted. Additional signaling may also be performed as desired. As shown, the signaling flow may operate as follows.

At 1330, P2P device 1302 (non-scheduler, QoS source, datapath responder, publisher) may send a publish message to P2P device 1362 (scheduler, QoS sink, datapath initiator, subscriber). The publish message may include FA preferences and limitations, including scheduler rank of P2P device 1302. In other words, a P2P layer 1306 of P2P device 1302 may transmit a message to P2P layer 1366 of P2P device 1362. Note that The P2P device 1302 (which may be similar to or the same as client station 106 and/or AP 112 described above) may be configured to operate according to a peer-to-peer protocol such as Wi-Fi direct, Apple wireless direct link (AWDL), and/or Neighbor Awareness Networking (NAN), among other peer-to-peer protocols. In other words, P2P layer 1306 may be configured to communicate according to a peer-to-peer protocol such as Wi-Fi direct, AWDL, and/or NAN, among other peer-to-peer protocols. Note additionally that P2P device 1362 (which may be similar to or the same as client station 106 and/or AP 112 described above) may be configured to operate according to a peer-to-peer protocol such as Wi-Fi direct, Apple wireless direct link (AWDL), and/or Neighbor Awareness Networking (NAN), among other peer-to-peer protocols. In other words, P2P layer 1366 may be configured to communicate according to a peer-to-peer protocol such as Wi-Fi direct, AWDL, and/or NAN, among other peer-to-peer protocols.

At 1332, P2P layer 1366 may send a datapath request message to P2P layer 1306. The datapath request message may be sent subsequent to a P2P layer 1366 receiving a datapath request message (or call) from upper layers 1364 at 1372. The datapath request message may include FA preference and limitations, including scheduler rank of P2P device 1362. In addition, the datapath request may include a preliminary FA schedule proposal. The preliminary FA schedule proposal may be effective immediately or at a future time (i.e., a preferred proposal).

At 1334, P2P layer 1306 may send a datapath response message to P2P layer 1366. The datapath response may be sent subsequent to P2P layer 1306 receiving QoS requirements from upper layers 1304. Since P2P device 1302 is the QoS Source, the datapath response may include a datapath QoS request based on upper layers 1304 QoS requirements, and may either reject or accept the preliminary FA schedule proposal. If P2P layer 1306 accepts the FA schedule proposal, the FA update may include a compliant FA schedule. If P2P layer 1306 rejects the FA schedule proposal, the FA update may include a counter FA schedule proposal.

At 1336, P2P layer 1366 may send an FA update message to P2P layer 1306 which may include (or carry) an updated FA schedule proposal based (at least in part) on P2P layer 1306's response at 1334. The updated FA schedule proposal may meet the datapath QoS requirements request from P2P layer 1306.

At 1338, P2P layer 1306 may send an FA update message to P2P layer 1366 which may include (or carry) a response to P2P layer 1366's updated FA schedule proposal.

At 1350, upper layers 1304 and 1364 may update service data session capabilities, including detailed QoS requirements and capabilities. In other words, upper layers 1304 and 1364 may negotiate or adapt current QoS requirements for the service data session based on the QoS requirements. For example, in some embodiments, a service and/or application of a QoS source P2P device may propose updated QoS requirement parameters including, but not limited to, user priority, service interval, data rate, delay bound, and/or burst size. In some embodiments, the user priority may be associated with an IEEE 802.1D user priority. In some embodiments, data rate may include one or more of a minimum data rate, a mean data rate, and/or a peak data rate. A QoS source device may also communicate and negotiate the QoS requirements with a peer QoS sink device.

At 1340, subsequent to upper layers 1304 and 1364 QoS requirements updates at 1350, P2P layer 1306 may send another FA update message to P2P layer 1366 which may include (or carry) an updated datapath QoS request based (at least in part) on updates received at 1350.

At 1342, P2P layer 1366 may send another FA update message to P2P layer 1306 which may include (or carry) an updated FA schedule proposal based (at least in part) on P2P layer 1306's updated datapath QoS request at received at 1340.

At 1344, P2P layer 1306 may send another FA update message to P2P layer 1366 which may include (or carry) a response to P2P layer 1366's updated FA schedule proposal.

Once P2P layer 1366 collects sufficient FA schedule responses from P2P layer 1306, e.g. after 1338 or 1344, P2P layer 1366 may confirm the datapath with a datapath confirm message (or event) from P2P layer 1366 to the upper layers 1364, e.g., at 1374 or 1378.

FIG. 14 illustrates an example of a signaling flow between peer-to-peer devices for FA QoS negotiation according to some embodiments. The signaling flow illustrated by FIG. 14 may be used in conjunction with any of the systems or devices shown in the above Figures, among other devices. In various embodiments, some of the signaling flow shown may be performed concurrently, in a different order than shown, or may be omitted. Additional signaling may also be performed as desired. As shown, the signaling flow may operate as follows.

At 1430, P2P device 1402 (scheduler, QoS source, datapath responder, publisher) may send a publish message to P2P device 1462 (non-scheduler, QoS sink, datapath initiator, subscriber). The publish message may include FA preferences and limitations, including scheduler rank of P2P device 1402. In other words, a P2P layer 1406 of P2P device 1402 may transmit a message to P2P layer 1466 of P2P device 1462. Note that The P2P device 1402 (which may be similar to or the same as client station 106 and/or AP 112 described above) may be configured to operate according to a peer-to-peer protocol such as Wi-Fi direct, Apple wireless direct link (AWDL), and/or Neighbor Awareness Networking (NAN), among other peer-to-peer protocols. In other words, P2P layer 1406 may be configured to communicate according to a peer-to-peer protocol such as Wi-Fi direct, AWDL, and/or NAN, among other peer-to-peer protocols. Note additionally that P2P device 1462 (which may be similar to or the same as client station 106 and/or AP 112 described above) may be configured to operate according to a peer-to-peer protocol such as Wi-Fi direct, Apple wireless direct link (AWDL), and/or Neighbor Awareness Networking (NAN), among other peer-to-peer protocols. In other words, P2P layer 1466 may be configured to communicate according to a peer-to-peer protocol such as Wi-Fi direct, AWDL, and/or NAN, among other peer-to-peer protocols.

At 1432, P2P layer 1466 may send a datapath request message to P2P layer 1406. The datapath request message may include FA preference and limitations, including scheduler rank of P2P device 1462. In addition, the datapath request may include a preliminary FA schedule proposal. The preliminary FA schedule proposal may be effective immediately or at a future time (i.e., a preferred proposal).

At 1434, P2P layer 1406 may send a datapath response message to P2P layer 1466. The datapath response message may be sent subsequent to a P2P layer 1406 receiving QoS requirements from upper layers 1404. The datapath response message may include a datapath QoS request, based (at least in part) on upper layers 1406's QoS requirements, and a formal FA schedule proposal.

At 1436, P2P layer 1466 may send an FA update message to P2P layer 1406 which may include (or carry) a response to the FA schedule proposal received from P2P layer 1406 at 1434.

At 1438, P2P layer 1406 may send an FA update message to P2P layer 1466 which may include (or carry) an updated FA schedule proposal based (at least in part) on the response received from P2P layer 1466 at 1436.

At 1450, upper layers 1404 and 1464 may update service data session capabilities, including detailed QoS requirements and capabilities. In other words, upper layers 1404 and 1464 may negotiate or adapt current QoS requirements for the service data session based on the QoS requirements. For example, in some embodiments, a service and/or application of a QoS source P2P device may propose updated QoS requirement parameters including, but not limited to, user priority, service interval, data rate, delay bound, and/or burst size. In some embodiments, the user priority may be associated with an IEEE 802.1D user priority. In some embodiments, data rate may include one or more of a minimum data rate, a mean data rate, and/or a peak data rate. A QoS source device may also communicate and negotiate the QoS requirements with a peer QoS sink device.

At 1440, subsequent to upper layers 1404 and 1464 QoS requirements updates at 1450, P2P layer 1406 may send another FA update message to P2P layer 1466 which may include (or carry) an updated datapath QoS requirements request and an updated FA schedule proposal based (at least in part) on updates received at 1450.

At 1442, P2P layer 1466 may send another FA update message to P2P layer 1406 which may include (or carry) a response to P2P layer 1406's updated FA schedule proposal.

At 1444, P2P layer 1406 may send another FA update message to P2P layer 1466 which may include (or carry) another updated FA schedule proposal based on the response received from P2P layer 1466 at 1442.

Once P2P layer 1466 collects sufficient FA schedule responses from P2P layer 1406, e.g. after 1438 or 1444, P2P layer 1466 may confirm the datapath with a datapath confirm message (or event) from P2P layer 1466 to the upper layers 1464, e.g., at 1474 or 1478.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
   at least one antenna;
   a first wireless interface and a second wireless interface, each configured to perform wireless communications; and
   at least one processor communicatively coupled to one or more radios, wherein the one or more radios are associated with the first and second wireless interfaces;
   wherein the wireless station is configured to:
   detect, via the first wireless interface, a neighboring wireless station that is configured to perform peer-to-peer Wi-Fi communication;
   establish, via peer-to-peer negotiation, a datapath schedule for a service with the neighboring wireless station, wherein the datapath schedule is based at least in part on quality of service requirements of the service, wherein the quality of service requirements include a required further availability slot allocation, wherein the further availability slot allocation is comprised in a quality of service request message that comprises a preferred size of a Neighbor Awareness Networking data link (NDL) time block.

2. The wireless station of claim 1,
   wherein the wireless station is a quality of service source.

3. The wireless station of claim 2,
   wherein the wireless station is further configured to:
   transmit the quality of service requirements to the neighboring wireless station.

4. The wireless station of claim 2,
   wherein the wireless station implements a protocol stack, wherein the protocol stack comprises at least one lower layer and at least one upper layer, and wherein the quality of service requirements are received by the at least one lower layer from the at least one upper layer.

5. The wireless station of claim 1,
   wherein the wireless station is a quality of service sink.

6. The wireless station of claim 5,
   wherein the wireless station is further configured to:
   receive the quality of service requirements from the neighboring wireless station.

7. The wireless station of claim 1,
   wherein the quality of service requirements comprise one or more parameters, wherein the one or more parameters include at least one of:
   a user priority;
   a service interval;
   a data rate;
   a delay bound; or
   a burst size.

8. The wireless station of claim 1,
   wherein the quality of service request message further comprises:
   a maximum gap between contiguous Neighbor Awareness Networking data link (NDL) time blocks.

9. An apparatus, comprising:
   a memory; and
   a processor, wherein the processor is in communication with the memory and at least one Wi-Fi wireless interface comprising at least one antenna, wherein the processor is configured to:
   receive, via the at least one antenna of the at least one Wi-Fi wireless interface, an indication that a neighboring wireless station is configured to perform peer-to-peer Wi-Fi communications; and
   negotiate, via exchange of peer-to-peer Wi-Fi communications over the at least one antenna of the at least one Wi-Fi wireless interface, a datapath schedule for a service with the neighboring wireless station, wherein the datapath schedule is based at least in part on quality of service requirements of the service, wherein the negotiation includes exchange of a quality of service request message comprising at least a minimum number of time units required within a specified period, wherein the specified period comprises one or more discovery window intervals, and wherein the at least minimum number of time units required within a specified time period indicates a preferred size of a Neighbor Awareness Networking data link (NDL) time block.

10. The apparatus of claim 9,
    wherein the processor is further configured to:
    generate instructions to transmit, via peer-to-peer Wi-Fi communications over the at least one Wi-Fi wireless interface, the quality of service requirements to the neighboring wireless station.

11. The apparatus of claim 9,
    wherein the processor is further configured to implement a protocol stack, wherein the protocol stack comprises at least one lower layer and at least one upper layer, and wherein the quality of service requirements are received by the at least one lower layer from the at least one upper layer.

12. The apparatus of claim 9,
    wherein the processor is further configured to:
    receive, via peer-to-peer Wi-Fi communications over the at least one Wi-Fi wireless interface, the quality of service requirements from the neighboring wireless station.

13. The apparatus of claim 9,
    wherein the quality of service requirements further comprise one or more parameters, wherein the one or more parameters include at least one of:
    a user priority;
    a service interval;
    a data rate;
    a delay bound; or
    a burst size.

14. The apparatus of claim 13,
    wherein the service interval includes a minimum service interval and/or a maximum service interval.

15. The apparatus of claim 13,
    wherein the data rate includes one or more of a minimum data rate, a mean data rate, or a peak data rate.

16. A non-transitory computer readable memory medium storing program instructions executable by a processor to:
    receive, via peer-to-peer Wi-Fi communications, an indication that a neighboring wireless station is configured to perform peer-to-peer communications;
    determine quality of service requirements for a service, wherein the quality of service requirements include a required further availability slot allocation; and negotiate, via peer-to-peer Wi-Fi communications, a schedule for the service with the neighboring wireless station, wherein the schedule is based at least in part on quality of service requirements of the service, wherein the schedule indicates a further availability slot allocation, wherein the schedule comprised in a quality of service request message that comprises a preferred size of a Neighbor Awareness Networking data link (NDL) time block.

17. The non-transitory computer readable memory medium of claim 16,
wherein the program instructions are further executable to:
generate instructions to transmit, via peer-to-peer Wi-Fi communications, the quality of service requirements to the neighboring wireless station.

18. The non-transitory computer readable memory medium of claim 16,
wherein the program instructions are further executable to implement a protocol stack, wherein the protocol stack comprises at least one lower layer and at least one upper layer, and wherein the quality of service requirements are received by the at least one lower layer from the at least one upper layer.

19. The non-transitory computer readable memory medium of claim 16,
wherein the program instructions are further executable to:
receive, via peer-to-peer Wi-Fi communications, the quality of service requirements from the neighboring wireless station.

20. The non-transitory computer readable memory medium of claim 16,
wherein the quality of service request message further comprises:
a maximum gap between contiguous Neighbor Awareness Networking data link (NDL) time blocks.

* * * * *